United States Patent
Eom et al.

(10) Patent No.: US 11,501,674 B2
(45) Date of Patent: Nov. 15, 2022

(54) DISPLAY DEVICE

(71) Applicant: Samsung Display Co., Ltd., Yongin-si (KR)

(72) Inventors: Cheol Hwan Eom, Ansan-si (KR); Hyung Jun An, Cheonan-si (KR); Ji Phyo Hong, Hwaseong-si (KR); Jong Won Moon, Cheonan-si (KR); Hyea Weon Shin, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 320 days.

(21) Appl. No.: 16/780,613

(22) Filed: Feb. 3, 2020

(65) Prior Publication Data
US 2020/0312206 A1 Oct. 1, 2020

(30) Foreign Application Priority Data
Mar. 28, 2019 (KR) .................. 10-2019-0035855

(51) Int. Cl.
*G09G 3/00* (2006.01)
*G02F 1/1345* (2006.01)
*G09G 3/36* (2006.01)

(52) U.S. Cl.
CPC .......... *G09G 3/006* (2013.01); *G02F 1/1345* (2013.01); *G09G 3/3611* (2013.01); *G09G 2300/0426* (2013.01)

(58) Field of Classification Search
None
See application file for complete search history.

(56) References Cited

U.S. PATENT DOCUMENTS

| 6,411,359 B1 * | 6/2002 | Kobayashi | G02F 1/13452 349/149 |
| 6,466,202 B1 * | 10/2002 | Suso | G06F 1/1647 345/169 |
| 7,632,025 B2 * | 12/2009 | Sung | H04M 1/0264 396/428 |

(Continued)

FOREIGN PATENT DOCUMENTS

| JP | 3748075 B2 | 2/2006 |
| JP | 4251129 B2 | 4/2009 |

(Continued)

*Primary Examiner* — Patrick N Edouard
*Assistant Examiner* — Peijie Shen
(74) *Attorney, Agent, or Firm* — Lewis Roca Rothgerber Christie LLP

(57) ABSTRACT

A display device includes first lead lines connecting the circuit signal lines with the driving integrated circuit, and second lead lines connecting the panel signal lines with the driving integrated circuit, wherein the second lead lines comprise a 2-1 sub-lead line configured to supply a scan-high voltage signal from the driving integrated circuit to the panel signal lines, and a 2-2 sub-lead line configured to supply a scan-low voltage signal from the driving integrated circuit to the panel signal lines, wherein the first lead lines comprises a 1-1 sub-lead line connected to the driving integrated circuit, a 1-1-1 sub-lead line separated from the 1-1 sub-lead line in a first direction, a 1-2 sub-lead line spaced apart from the 1-1 sub-lead line in a second direction intersecting the first direction, and a 1-2-1 sub-lead line spaced apart from the 1-2 sub-lead line in the second direction.

20 Claims, 20 Drawing Sheets

(56) References Cited

U.S. PATENT DOCUMENTS

| | | | | |
|---|---|---|---|---|
| 2004/0084740 | A1* | 5/2004 | Hayashi | H01L 27/3276 257/432 |
| 2004/0137958 | A1* | 7/2004 | Sawai | H04M 1/0218 455/566 |
| 2004/0212728 | A1* | 10/2004 | Tsai | H04M 1/0218 348/376 |
| 2005/0024500 | A1* | 2/2005 | Katayama | H04N 5/2253 348/207.99 |
| 2005/0070344 | A1* | 3/2005 | Im | H04M 1/0264 455/575.1 |
| 2007/0070189 | A1* | 3/2007 | Lee | H04N 7/142 348/E7.079 |
| 2012/0314400 | A1* | 12/2012 | Bohn | G09F 9/35 361/679.01 |
| 2013/0021427 | A1* | 1/2013 | Park | H04M 1/0235 348/14.02 |
| 2013/0058063 | A1* | 3/2013 | O'Brien | G06F 1/1624 361/807 |
| 2014/0211399 | A1* | 7/2014 | O'Brien | G06F 1/1624 29/592.1 |
| 2014/0312486 | A1* | 10/2014 | Lee | H01L 23/36 257/713 |
| 2014/0319523 | A1* | 10/2014 | Lee | G09G 3/20 257/48 |
| 2016/0026381 | A1* | 1/2016 | Kim | G06F 3/0482 715/761 |
| 2016/0202781 | A1* | 7/2016 | Kim | G06F 1/1643 345/173 |
| 2016/0270234 | A1* | 9/2016 | Ahn | H05K 1/189 |
| 2017/0031217 | A1* | 2/2017 | Jung | G02F 1/1339 |
| 2017/0094168 | A1* | 3/2017 | Kang | G06T 11/00 |
| 2017/0310799 | A1* | 10/2017 | Lin | G06F 1/1652 |
| 2017/0344071 | A1* | 11/2017 | Lee | G06F 3/011 |
| 2018/0053905 | A1* | 2/2018 | Lee | H01L 27/3276 |
| 2018/0198896 | A1* | 7/2018 | Kang | H04M 1/0216 |
| 2019/0268455 | A1* | 8/2019 | Baek | H04M 1/0268 |
| 2019/0384438 | A1* | 12/2019 | Park | G06F 3/0482 |
| 2020/0177773 | A1* | 6/2020 | Yoo | H04M 1/0264 |
| 2020/0233465 | A1* | 7/2020 | Li | G06F 1/1669 |
| 2020/0295114 | A1* | 9/2020 | Moon | H05K 1/118 |
| 2020/0329131 | A1* | 10/2020 | Han | G06F 1/1658 |
| 2021/0135151 | A1* | 5/2021 | Baek | H01L 51/5237 |
| 2021/0159221 | A1* | 5/2021 | Li | G06F 1/1601 |
| 2021/0257389 | A1* | 8/2021 | Zhang | H01L 27/1259 |

FOREIGN PATENT DOCUMENTS

| | | |
|---|---|---|
| KR | 10-2014-0033834 A | 3/2014 |
| KR | 10-2014-0125673 A | 10/2014 |
| KR | 10-2014-0128733 A | 11/2014 |
| KR | 10-2016-0110861 A | 9/2016 |

* cited by examiner

DISPLAY DEVICE

CROSS-REFERENCE TO RELATED APPLICATION

This application claims priority to and the benefit of Korean Patent Application No. 10-2019-0035855 filed on Mar. 28, 2019 in the Korean Intellectual Property Office, the disclosure of which is incorporated herein by reference in its entirety.

BACKGROUND

1. Field

Aspects of some example embodiments of the present disclosure relate to a display device.

2. Description of the Related Art

Display devices represent data graphically. Such a display device includes a substrate on which a display area and a non-display area are defined. A plurality of pixels is positioned on the substrate in the display area, and a plurality of pads and the like may be positioned on the substrate in the non-display area. A flexible film (e.g., COF film) on which a driving integrated circuit or the like are mounted may be coupled to the plurality of pads, to transmit driving signals to the pixels. A main circuit board for controlling the driving integrated circuit or the like is mounted on the flexible film.

The flexible film may have a stack structure including, for example, a first line layer and a second line layer positioned on the first line layer and connected to the first line layer through via holes. The first line layer may be coupled to the pads, and the second line layer may be coupled to the pads of the main circuit board.

The flexible film may be tested for defects by using test pads of a test part that are exposed through the first line layer. Then, the test part is cut, such that the side surfaces of the stack structure are exposed to the outside. In this regard, ions and moisture may be introduced through the exposed side surfaces of the first line layer and the second line layer, thereby corroding the lines. If the lines are corroded, an electric short-circuit may occur in the signal lines of the first line layer and the second line layer.

The above information disclosed in this Background section is only for enhancement of understanding of the background and therefore the information discussed in this Background section does not necessarily constitute prior art.

SUMMARY

Aspects of some example embodiments of the present disclosure provide a display device that may prevent or reduce instances of an electric short-circuit between a plurality of signal lines included in line layers of a first circuit board.

These and other aspects, embodiments, and characteristics of the present disclosure will become more apparent to those of ordinary skill in the art upon review of the Detailed Description and Claims to follow.

According to some example embodiments of the present disclosure, it may be possible to prevent or reduce instances of an electric short-circuit between a plurality of signal lines included in line layers of a first circuit board.

It should be noted that characteristics of the present disclosure are not limited to those described above and other effects of the present disclosure will be more apparent to those skilled in the art from the following descriptions.

According to some example embodiments of the present disclosure, a display device includes: a display panel including a display area and a panel pad area around the display area; a first circuit board having an end attached to the panel pad area; and a second circuit board attached to another end of the first circuit board, wherein the panel pad area comprises a plurality of panel signal lines, wherein the second circuit board comprises a plurality of circuit signal lines, wherein the first circuit board comprises a first line layer coupled with the plurality of panel signal lines, an insulating layer on the first line layer and comprising via holes, a second line layer on the insulate layer and electrically connected to the first line layer through the via holes, and a driving integrated circuit on the second line layer and electrically connected to the second line layer, wherein the second line layer comprises a plurality of first lead lines connecting the circuit signal lines with the driving integrated circuit, and a plurality of second lead lines connecting the panel signal lines with the driving integrated circuit, wherein the second lead lines comprise a 2-1 sub-lead line supplying a scan-high voltage signal from the driving integrated circuit to the panel signal lines, and a 2-2 sub-lead line supplying a scan-low voltage signal from the driving integrated circuit to the panel signal lines, wherein the plurality of first lead lines comprises a 1-1 sub-lead line physically connected to the driving integrated circuit, a 1-1-1 sub-lead line separated from the 1-1 sub-lead line in a first direction, a 1-2 sub-lead line spaced apart from the 1-1 sub-lead line in a second direction intersecting the first direction, and a 1-2-1 sub-lead line spaced apart from the 1-2 sub-lead line in the second direction, and wherein the first direction faces the second circuit board from the first lead line.

According to some example embodiments, the 1-1 sub-lead line protrudes from the 2-1 sub-lead line in the second direction, and wherein the 1-2 sub-lead line protrudes from the 2-2 sub-lead line in the second direction.

According to some example embodiments, the 1-1 sub-lead line is electrically separated from the 1-1-1 sub-lead line, and wherein the 1-2 sub-lead line is electrically separated from the 1-2-1 sub-lead line.

According to some example embodiments, the plurality of first lead lines comprises a 1-3 sub-lead line on one side of the 1-1 sub-lead line and the 1-2 sub-lead line in the first direction, and a 1-4 sub-lead line and a 1-5 sub-lead line on an opposite side thereof in the first direction, wherein the 1-3 sub-lead line electrically connects the circuit signal line with the driving integrated circuit, and wherein the 1-4 sub-lead line and the 1-5 sub-lead line electrically connects the circuit signal line with the second lead line.

According to some example embodiments, the 1-4 sub-lead line supplies a high-level voltage signal from the second circuit board to the panel signal lines, and wherein the 1-5 sub-lead line supplies a low-level voltage signal from the second circuit board to the panel signal lines.

According to some example embodiments, the plurality of first second lines comprise a 2-3 sub-lead line on one side of the 2-1 sub-lead line and the 2-2 sub-lead line in the first direction, and a 2-4 sub-lead line and a 2-5 sub-lead line on another side thereof in the first direction, According to some example embodiments, the 2-3 sub-lead line is electrically connected to the driving integrated circuit, and wherein the 2-4 sub-lead line is electrically connected to the 1-4 sub-lead line, and wherein the 2-5 sub-lead line is electrically connected to the 1-5 sub-lead line.

According to some example embodiments, the first line layer comprises a plurality of third lead lines, and wherein the third lead lines comprise a 3-1 sub-lead line connected to the 2-1 sub-lead line, a 3-2 sub-lead line connected to the 2-2 sub-lead line, a 3-3 sub-lead line connected to the 2-3 sub-lead line, a 3-4 sub-lead line connected to the 2-4 sub-lead line, a 3-5 sub-lead line connected to the 2-5 sub-lead line, and a 3-1-1 sub-lead line electrically separated from the 3-1 sub-lead line in the second direction.

According to some example embodiments, the via holes comprise a first via hole connecting the 3-1 sub-lead line with the 2-1 sub-lead line, and a second via hole connecting the 3-2 sub-lead line with the 2-2 sub-lead line, and wherein the second via hole is closer to the second circuit board than the first via hole is when viewed from a plan view.

According to some example embodiments, the 2-1 sub-lead line is a gate-high voltage line (VGHL) and the 2-2 sub-lead line is a gate-low voltage line (VGLL).

According to some example embodiments, the display device further comprises a cover panel sheet, wherein the cover panel sheet comprises a metal layer under the display panel, and a cover insulating layer under the metal layer, and wherein the first circuit board is bent away from a display surface to be located under the cover insulating layer.

According to some example embodiments, the metal layer is an electromagnetic-wave blocking layer.

According to some example embodiments, the cover insulating layer comprises fluorine ions or sulfur ions.

According to some example embodiments, the first circuit board further comprises a first protective organic layer between the cover insulating layer and the first line layer, and a second protective organic layer on the second line layer, wherein the first protective organic layer partially exposes an upper surface of the first lead line.

According to some example embodiments, inner side surfaces of the first protective organic layer, the first line layer, the insulating layer, the second line layer and the second protective organic layer are aligned with one another in a thickness direction and are exposed.

According to some example embodiments, the display device further comprises an inter-module coupling member between the first protective organic layer and the cover insulating layer and coupling the cover panel sheet with the first circuit board.

According to some example embodiments, an inner side surface of the first circuit board protrudes inward from an inner side surface of the inter-module coupling member.

According to some example embodiments, the first line layer and/or the first protective organic layer comprise surface cracks around the inner side surface of the inter-module coupling member when viewed from a plan view.

According to some example embodiments of the present disclosure, a printed circuit board includes: a first line layer; an insulating layer on the first line layer and comprising via holes; a second line layer on the insulate layer and electrically connected to the first line layer through the via holes; and a driving integrated circuit on the second line layer and electrically connected to the second line layer, wherein the second line layer comprises a plurality of first lead lines on a side of the driving integrated circuit in a direction to be connected to the driving integrated circuit and spaced apart from one another in another direction intersecting the direction, and a plurality of second lead lines on an opposite side of the driving integrated circuit in the direction to be connected to the driving integrated circuit, wherein the plurality of first lead lines comprises a 1-1 sub-lead line, a 1-2 sub-lead line, a 1-1-1 sub-lead line spaced apart from the 1-1 sub-lead line in the direction, and a 1-2-1 sub-lead line spaced apart from the 1-2 sub-lead line in the direction, wherein the plurality of second lead lines comprises a 2-1 sub-lead line supplying a scan-high voltage signal from the driving integrated circuit to a display panel, and a 2-2 sub-lead line supplying a scan-low voltage signal from the driving integrated circuit to the display panel, wherein the plurality of first lead lines comprises a 1-1 sub-lead line physically connected to the driving integrated circuit, a 1-1-1 sub-lead line separated from the 1-1 sub-lead line in a first direction, a 1-2 sub-lead line spaced apart from one another in a second direction intersecting the first direction of the 1-1 sub-lead line, and a 1-2-1 sub-lead line spaced apart from one another in the second direction of the 1-2 sub-lead line, and wherein the first direction faces the first lead line from the driving integrated circuit.

According to some example embodiments, the 1-1 sub-lead line is electrically separated from the 1-1-1 sub-lead line, and wherein the 1-2 sub-lead line is electrically separated from the 1-2-1 sub-lead line.

According to some example embodiments, the plurality of first lead lines comprises a 1-3 sub-lead line on one side of the 1-1 sub-lead line and the 1-2 sub-lead line in the first direction, and a 1-4 sub-lead line and a 1-5 sub-lead line on another side thereof in the first direction, According to some example embodiments, the 1-4 sub-lead line supplies a high-level voltage signal to the display panel, and wherein the 1-5 sub-lead line supplies a low-level voltage signal to the display panel.

BRIEF DESCRIPTION OF THE DRAWINGS

The above and other aspects and features of the present disclosure will become more apparent by describing in detail aspects of some example embodiments thereof with reference to the attached drawings, in which.

DETAILED DESCRIPTION

Figure 1:
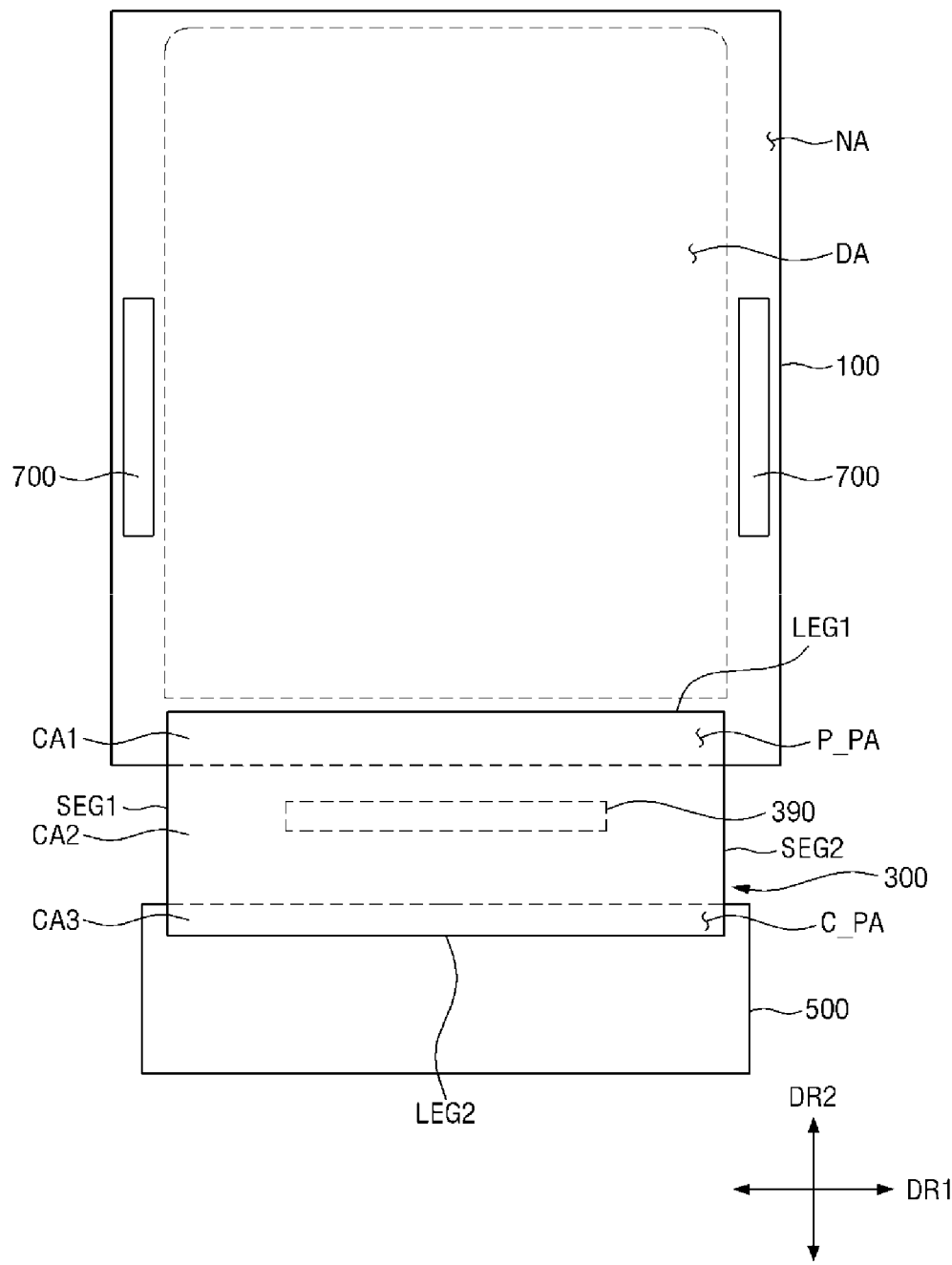
FIG. 1 is a plan view of a display device according to some example embodiments of the present disclosure.
Figure 2:
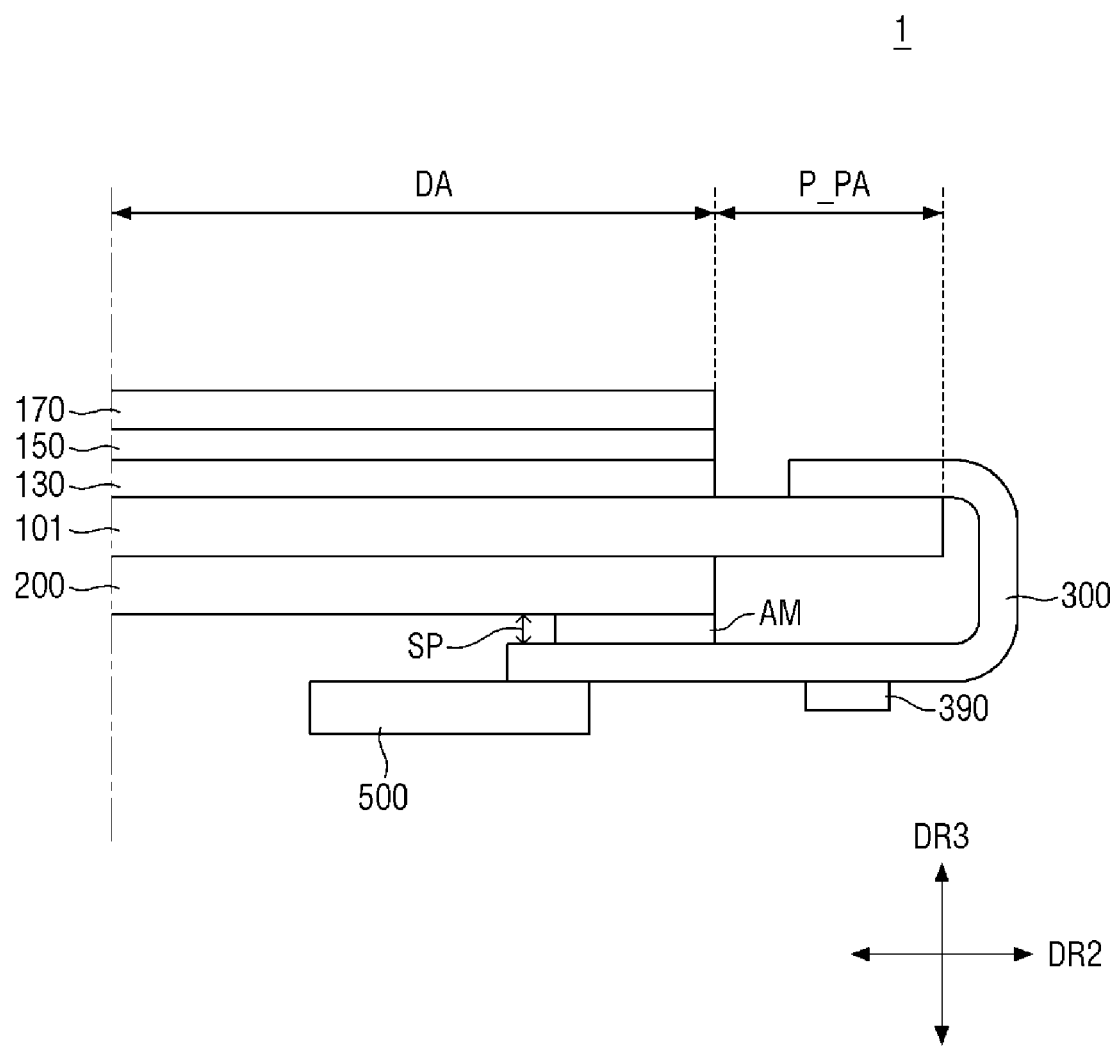
FIG. 2 is a cross-sectional view of the display device of FIG. 1.
Figure 3:
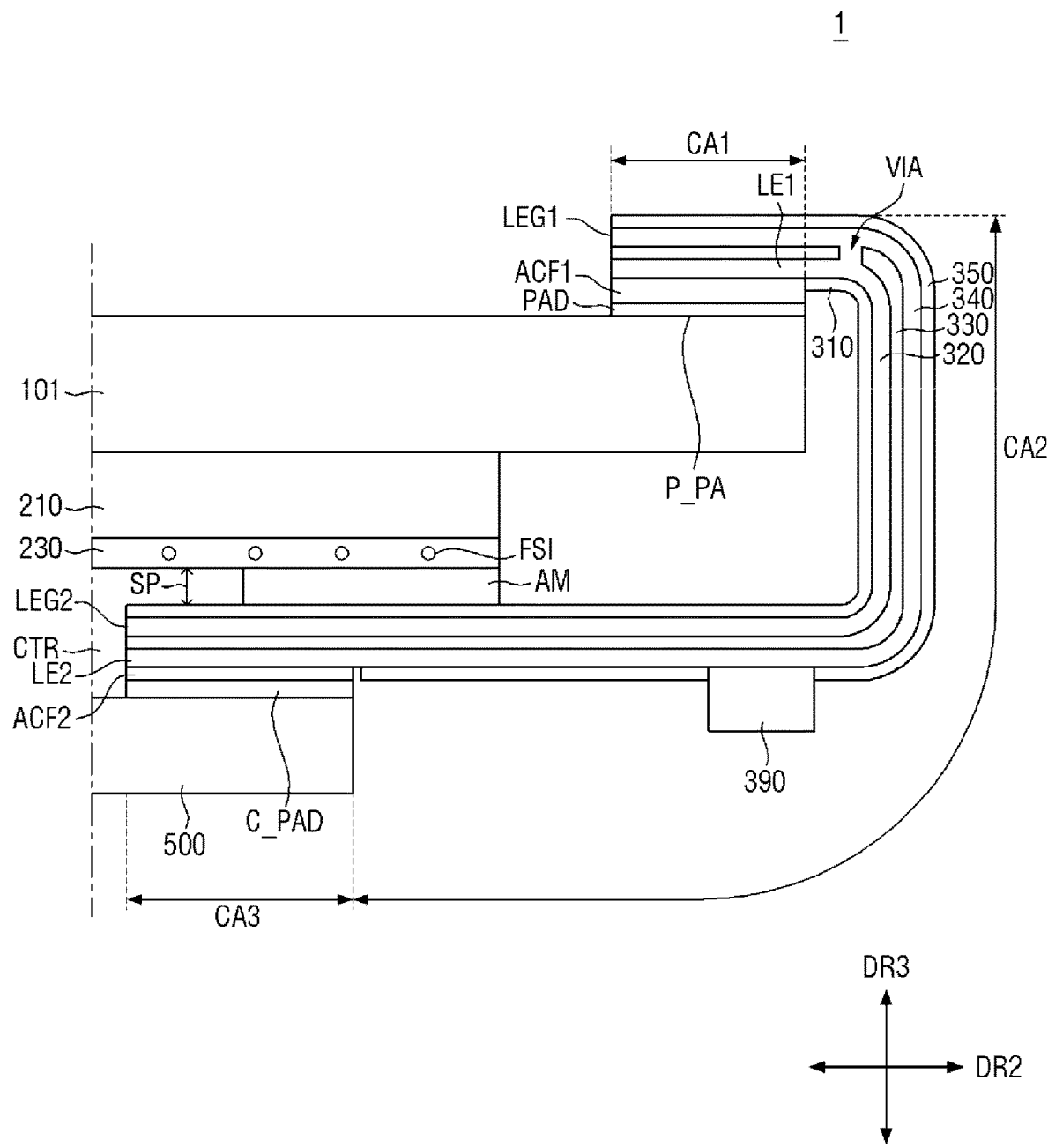
FIG. 3 is an enlarged, cross-sectional view of the display device of FIG. 2.
Figure 4:
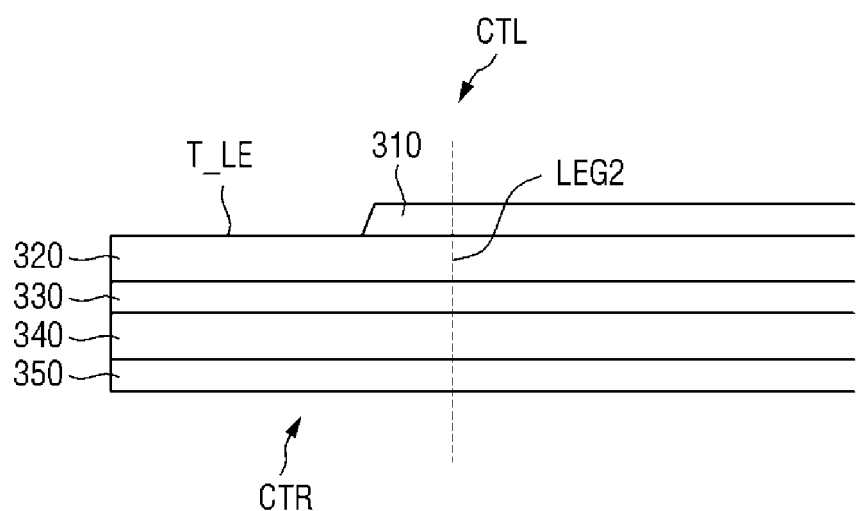
FIG. 4 is a cross-sectional view showing a cutting part where test pads are located.
Figure 5:
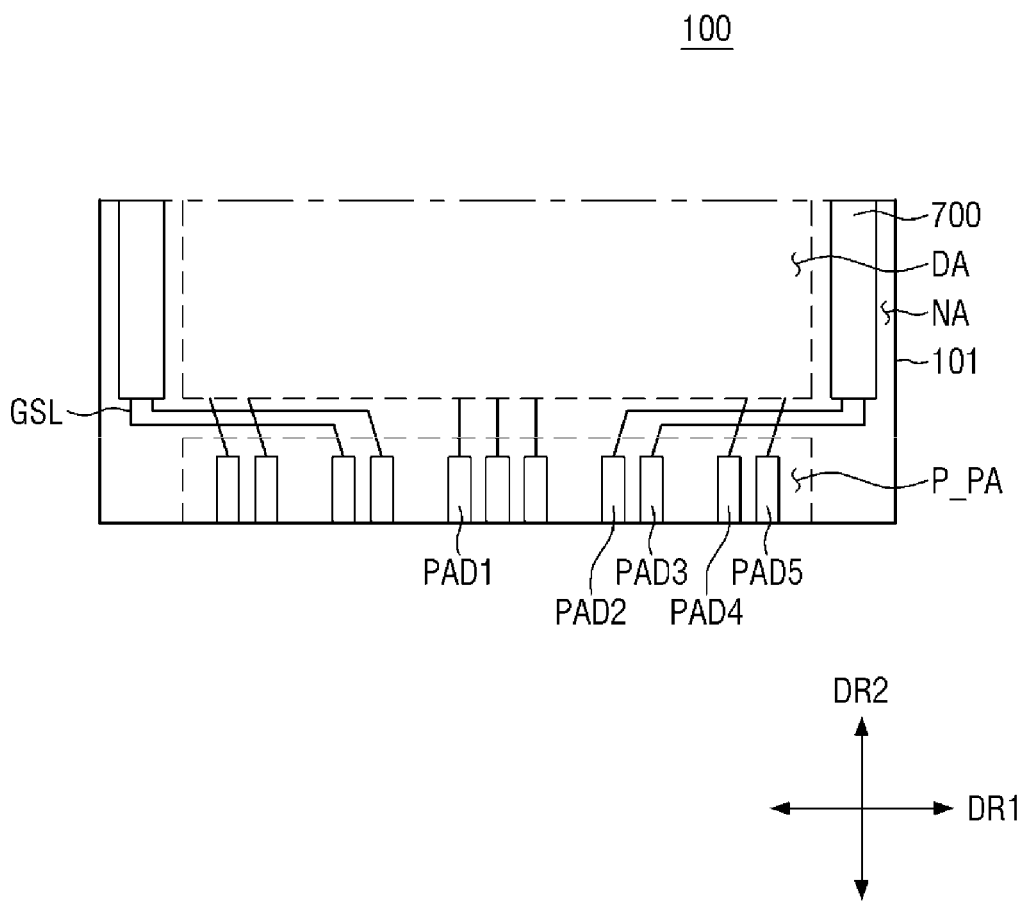
FIG. 5 is a view showing the layout of a panel pad area.
Figure 6:
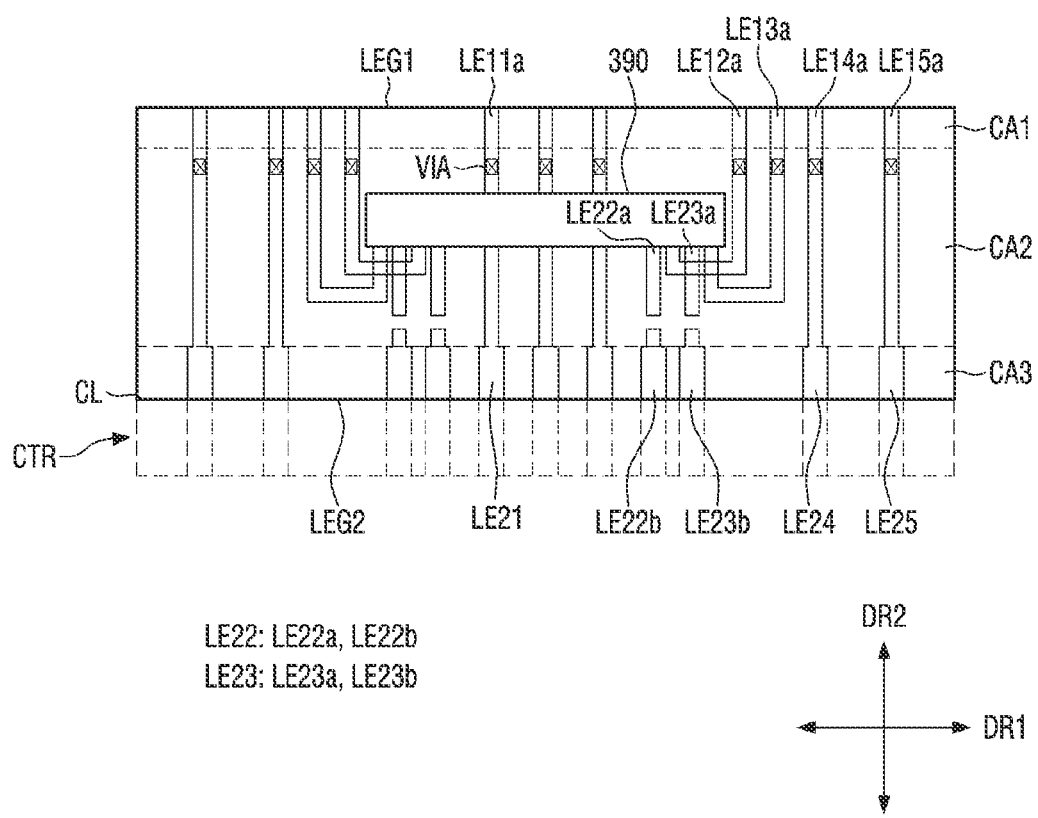
FIG. 6 is a plan view showing the layout of a second line layer and a driving integrated circuit of a first circuit board.
Figure 7:
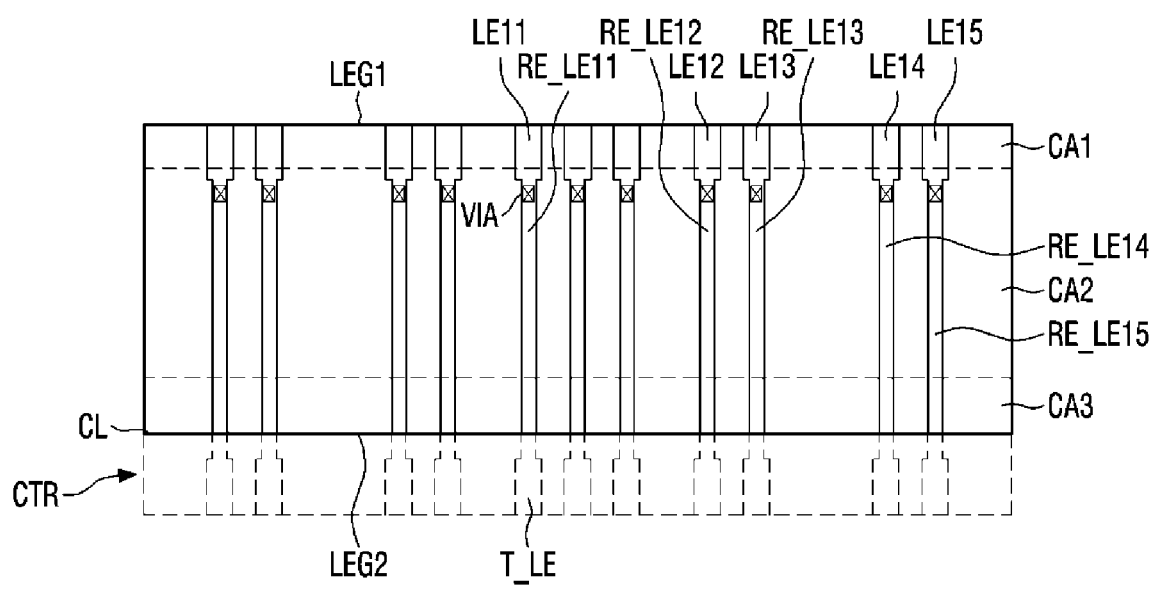
FIG. 7 is a plan view showing the layout of a first line layer of the first circuit board.
Figure 7:
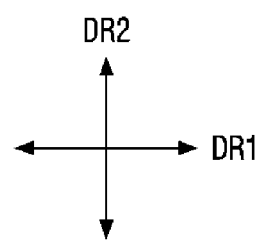

FIG. 1 is a plan view of a display device according to some example embodiments of the present disclosure. FIG. 2 is a cross-sectional view of the display device of FIG. 1. FIG. 3 is an enlarged, cross-sectional view of the display device of FIG. 2. FIG. 4 is a cross-sectional view showing a cutting part where test pads are located. FIG. 5 is a view showing the layout of a panel pad area. FIG. 6 is a plan view showing the layout of a second line layer and a driving integrated circuit of a first circuit board. FIG. 7 is a plan view showing the layout of a first line layer of the first circuit board.

Display devices display moving images or still images. A display device may be used as the display screen of portable electronic devices such as a mobile phone, a smart phone, a tablet PC, a smart watch, a watch phone, a mobile communications terminal, an electronic notebook, an electronic book, a portable multimedia player (PMP), a navigation device and a ultra mobile PC (UMPC), as well as the display screen of various products such as a television, a notebook, a monitor, a billboard and the Internet of Things.

Referring to FIGS. 1 to 7, a display device 1 may include a display panel 100 for displaying images, a first circuit board 300 connected to the display panel 100, and a second circuit board 500 connected to the first circuit board 300.

For example, an organic light-emitting display panel may be employed as the display panel 100. In the following description, the organic light-emitting display panel is employed as the display panel 100. It is, however, to be understood that other types of display panels such as a liquid-crystal display (LCD) panel, a quantum-dot organic light-emitting display (QD-OLED) panel, a quantum-dot liquid-crystal display (QD-LCD) panel, a quantum-nano light-emitting display (QNED) panel and a micro LED panel.

The display panel 100 includes a display area DA where a plurality of pixel areas is located, and a non-display area NA located around the display area DA. The display area DA may have a rectangular shape having corners at the right angle or rounded corners when viewed from a plan view. The display area DA may include shorter sides and longer sides. The shorter sides of the display area DA may be extended in a first direction DR1. The longer sides of the display area DA may be extended in a second direction DR2. It is, however, to be understood that the present disclosure is not limited thereto. The shape of the display area DA is not limited to a rectangle, and it may have other shapes such as a circle and an ellipse. The non-display area NA may be positioned adjacent to the two shorter sides and the two longer sides of the display area DA. In such case, the display area NA may surround all of the sides of the display area DA and may form the edges of the display area DA. It is, however, to be understood that the present disclosure is not limited thereto. The non-display area NA may be positioned adjacent only to the two shorter sides or only to the two longer sides of the display area DA.

A gate driver 700 for applying a scan control signal for controlling a scan-high voltage, a scan-low voltage and a scan signal may be further positioned in the non-display area NA adjacent to each of the two shorter sides of the display area DA.

The non-display area NA of the display panel 100 further includes a panel pad area P_PA. The panel pad area P_PA may be located, for example, around one shorter side of the display area DA, but embodiments according to the present disclosure are not limited thereto. It may be located around each of the two shorter sides of the display area DA or around each of the two shorter sides and the longer sides of the display area DA.

The first circuit board 300 has a stack structure. The stack structure may include a plurality of line layers, insulating layers located between the line layers, and organic protective layers arranged on and under the plurality of line layers.

Furthermore, the first circuit board 300 may further include a driving integrated circuit connected to the line layers. The stack structure on the first circuit board 300 will be described in more detail later.

The first circuit board 300 may include a first longer edge LEG1 attached to the panel pad area P_PA of the display panel 100, a second longer edge LEG2 attached to the second circuit board 500 and opposed to the first longer edge LEG1, and the shorter edges SEG1 and SEG2.

The first circuit board 300 may include a first circuit area CA1 having one side attached to the panel pad area P_PA of the display panel 100, a second circuit area CA2 located on one side of the first circuit area CA1 in the second direction DR2, and a third circuit area CA3 located on one side of the second circuit area CA2 in the second direction DR2 and attached to the second circuit board 500.

The second circuit board 500 may include a circuit pad area attached to the third circuit area CA3 of the first circuit board 300. A plurality of circuit pads may be located in the circuit pad area of the second circuit board 500 and connected to lead lines located in the third circuit area CA3 of the first circuit board 300.

Referring to FIG. 2, the display panel 100 includes a display substrate 101 arranged from the display area DA to the panel pad area P_PA, a circuit layer 130 located on the display substrate 101 in the display area DA, an emissive layer 150 located on the circuit layer 130 in the display area DA, and an encapsulating layer 170 located on the emissive layer 150 in the display area DA. Each of the pixel areas may include the circuit layer 130 and the emissive layer 150.

The circuit layer 130 may include a display line, a display electrode and at least one transistor, and can control the amount of light emitted from the emissive layer 150. The emissive layer 150 may include an organic light-emitting material. The emissive layer 150 may be sealed by the encapsulation layer 170. The encapsulation layer 170 can seal the emissive layer 150 to prevent or reduce moisture and the like being introduced from the outside. The encapsulation layer 170 may be made up of a single inorganic layer or multiple layers thereof, or a stack of inorganic layers and organic layers alternately stacked on one another.

In addition, the display device 1 may further include a cover panel sheet 200 located under the display panel 100. The cover panel sheet 200 may be attached to the rear surface of the display panel 100. The cover panel sheet 200 includes at least one functional layers and a lower insulating layer. The functional layer may perform a heat dissipation function, an electromagnetic wave shielding function, a grounding function, a buffering function, a strength enhancing function, a supporting function, and/or a digitizing function. The functional layer may be a sheet layer made of a sheet, a film layer made of a film, a thin film layer, a coating layer, a panel, a plate, etc. A single functional layer may be made up of a single layer or a plurality of thin films or coating layers stacked on one another. The functional layer may be, for example, a supporting substrate, a heat-radiating layer, an electromagnetic wave shielding layer, a shock absorbing layer, a digitizer, etc.

The first circuit board 300 may be bent downward in a third direction DR3 as shown in FIG. 2. The other side of the first circuit board 300 and the second circuit board 500 may be positioned below the cover panel sheet 200.

The display device 1 may further include an inter-module coupling member AM located between the cover panel sheet 200 and the first circuit board 300. The inter-module coupling member AM may be a pressure sensitive adhesive (PSA). The lower surface of the cover panel sheet 200 may be coupled to the first circuit board 300 by using the inter-module coupling member AM. The inner side surface of the inter-module coupling member AM may be located more to the outside than the inner side surface of the first circuit board 300. In other words, the inner side surface of the first circuit board 300 may protrude toward the inner side than the inter-module coupling member AM. Accordingly, it may be possible to prevent or reduce instances of defects caused by particles that may adhere if the inter-module coupling member AM protrudes toward the inside of the first circuit board 300. In addition, it may be possible to prevent or reduce instances of the inter-module coupling member AM flowing to the side surface of the first circuit board 300, etc.

The protruding part of the first circuit board 300 may be spaced apart from the cover panel sheet 200 by a spacing SP.

Referring to FIG. 3, the cover panel sheet 200 according to some example embodiments of the present disclosure may include a cover metal layer 210 located between the display substrate 101 of the display panel 100 and the inter-module coupling member AM, and a cover insulating layer 230 located between the metal layer 210 and the inter-module coupling member AM.

The cover metal layer 210 may be located under the display substrate 101. The cover metal layer 210 may be an electromagnetic-wave blocking layer. For example, the cover metal layer 210 may include a metal thin film such as copper (Cu), aluminum (Al), gold (Au) and silver (Ag). According to some example embodiments, the cover panel sheet 200 may further include a heat dissipation layer between the cover metal layer 210 and the cover insulating layer 230. The heat dissipation layer may include a material such as graphite and carbon nanotube (CNT).

The cover insulating layer 230 may be located under the cover metal layer 210. The cover insulating layer 230 may prevent current from flowing between the plurality of line layers of the first circuit board 300 and the cover metal layer 210.

The cover insulating layer 230 may include at least one of a silicon compound or a metal oxide. For example, the cover insulating layer 230 may include at least one of silicon oxide, silicon nitride, silicon oxynitride, aluminum oxide, tantalum oxide, hafnium oxide, zirconium oxide, titanium oxide, or the like. They may be used alone or in combinations.

As shown in FIG. 3, the cover insulating layer 230 may further include additive ions FSI to improve the insulation. For example, the additive ions FSI may be fluorine ion ($F^-$) or sulfur ion ($S^{2-}$).

The first circuit board 300 may include a first protective organic layer 310, a first line layer 320 located on the first protective organic layer 310, a lead insulating layer 330 located on the first line layer 320, a second line layer 340 located on a lead insulating layer 330, and a second protective organic layer 350 located on the second line layer 340.

The first protective organic layer 310 may be located under the first line layer 320 to cover the first line layer 320 and protect the first line layer 320.

The first protective organic layer 310 may be made of a material including an organic insulating material. Examples of the organic insulating material may include polyacrylate resin, epoxy resin, phenolic resin, polyamide resin, polyimide resin, unsaturated polyesters resin, polyphenylene ether resin, polyphenylene sulfide resin, benzocyclobutene (BCB), etc.

The first protective organic layer 310 may be located from the second circuit area CA2 to the third circuit area CA3. The first protective organic layer 310 may expose the first line layer 320 in the first circuit area CA1. The first line layer 320 may include a plurality of first lead lines LE1. The first lead lines LE1 exposed by the first protective organic layer 310 may be coupled to a signal line PAD.

As shown in FIG. 3, the signal line PAD may be located on the panel pad area P_PA of the display substrate 101. The signal line PAD may include at least one selected from the group consisting of: molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu). The signal line PAD may be made up of a single layer made of the above-listed materials. It is, however, to be understood that the present disclosure is not limited thereto. The signal line PAD may be a stack of multiple layers.

The first line layer 320 or the first lead line LE1 exposed by the first protective organic layer 310 may be coupled with the signal line PAD located on the panel pad area P_PA. A first conductive coupling member ACF1 may be located between the first line layer 320 and the signal line PAD. That is to say, the first line layer 320 can be electrically coupled with the signal line PAD through the first conductive coupling member ACF1.

In some implementations, the first lead line LE1 may be connected directly to the signal line PAD without the first conductive coupling member ACF1. That is to say, the first lead line LE1 may be connected directly to the upper surface of the exposed signal line PAD. For example, the first lead line LE1 may be coupled with the signal line PAD by ultrasonic bonding.

The first line layer 320 may include a metal material. The first line layer 320 may include at least one metal selected from the group consisting of: molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu).

The part of the first line layer 320 that is exposed by the first protective organic layer 310 may be electrically connected to the signal line PAD.

The lead insulating layer 330 may be located on the first line layer 320. The lead insulating layer 330 may include via holes VIA penetrating therethrough. The lead insulating layer 330 is located between the first line layer 320 and the second line layer 340 so that the first line layer 320 and the second line layer 340 are physically and electrically separated from each other except the via holes VIA.

Although the via holes VIA are formed in the second circuit area CA2 in the example shown in FIG. 3, the via holes VIA may be formed in the first circuit area CA1.

The lead insulating layer 330 may include at least one of a silicon compound or a metal oxide. For example, the lead insulating layer 330 may include at least one of silicon oxide, silicon nitride, silicon oxynitride, aluminum oxide, tantalum oxide, hafnium oxide, zirconium oxide, titanium oxide, or the like. They may be used alone or in combinations.

The second line layer 340 may be located on the lead insulating layer 330. The second line layer 340 may be in contact with the first line layer 320 through the via holes VIA of the lead insulating layer 330. The second line layer 340 may include at least one of the materials listed above as the examples of the first line layer 320. The constituent materials of the first line layer 320 may be identical to those of the second line layer 340, but the present disclosure is not limited thereto. The constituent materials of the first line layer 320 may be different from those of the second line layer 340.

The second protective organic layer 350 may be located on the second line layer 340. The second protective organic layer 350 may be located from the first circuit area CA1 to the second circuit area CA2. The second protective organic layer 350 may expose the second line layer 340 in the third circuit area CA3. The second line layer 340 may include a plurality of second lead lines LE2. The second lead lines LE2 exposed by the second protective organic layer 350 may be electrically coupled to the second circuit board 500. Besides, the second protective organic layer 350 may expose the second line layer 340 in the second circuit area CA2, and the exposed part of the second line layer 340 may be electrically connected to the driving integrated circuit 390.

The driving integrated circuit 390 may be located on the second circuit area CA2 of the second line layer 340. The driving integrated circuit 390 may include, for example, a data driving chip in which data driving circuits for applying a data signal and a data control signal for controlling the data signal are integrated, and a gate driving chip in which scan driving circuits for generating a scan-high voltage, a scan-low voltage and a scan control signal to transmit them to the gate driver 700 located in the non-display area NA. The driving integrated circuit 390 may be implemented by using chip-on-film (COF) technology to implement driving chips.

The second line layer 340 or the second lead line LE2 exposed by the second protective organic layer 350 may be coupled with a circuit signal line C_PAD located on the circuit pad area. A second conductive coupling member ACF2 may be located between the second line layer 340 and the signal line C_PAD. That is to say, the second line layer 340 can be electrically coupled with the circuit signal line C_PAD through the second conductive coupling member ACF2.

According to some example embodiments, the second lead line LE2 may be connected directly to the circuit signal line C_PAD without the second conductive coupling member ACF2. That is to say, the second lead line LE2 can be connected directly to the upper surface of the exposed circuit signal line C_PAD. For example, the second lead line LE2 can be coupled with the circuit signal line C_PAD by ultrasonic bonding.

The inner side surfaces of the first circuit board 300 including the first longer side edge LEG1 and the second longer side edge LEG2 may be exposed. For example, the inner side surface of the first protective organic layer 310, the inner side surface of the first line layer 320, the inner side surface of the lead insulating layer 330, the inner side surface of the second protective organic layer 350, which include the second longer edge LEG2 of the first circuit board 300, may be exposed together.

Referring to FIG. 4, the first circuit board 300 may be formed by removing a cutting region CTR from a single-piece circuit board along a cutting line CTL formed along the second longer side edge LEG2 described above with reference to FIG. 3.

The cutting region CTR of the single-piece circuit board may include a test lead line T_LE exposed by the first protective organic layer 310 of the first line layer 320 described above with reference to FIG. 3. After test is carried out on the single-piece circuit board to see if there is an electric signal and/or to measure the intensity of electric signals, etc. from the test lead line T_LE of the single-piece circuit board, the cutting region CTR of the single-piece circuit board may be removed. Then, the inner side surface of the first protective organic layer 310, the inner side surface of the first line layer 320, the inner side surface of the lead insulating layer 330, the inner side surface of the second protective organic layer 350, which include the second longer edge LEG2 of the first circuit board 300, may be exposed together, as described above.

Incidentally, the cover insulating layer 230 further includes the additive ions FSI to improve the insulation, as described above. The additive ions FSI may be used during the process of depositing the cover insulating layer 230 and may be located in the cover insulating layer 230 after the process. However, as will be described later, they may be eluted out of the cover insulating layer 230 through the external moisture in an environment of high temperature and high humidity. Once the additive ions FSI are eluted, they may cause corrosion of the line layers of the adjacent first circuit board 300. For example, the exposed inner side surfaces of the first line layer 320 and the second line layer 340 of the first circuit board 300 may be corroded by the eluted additive ions FSI. A detailed description thereon will be given later.

Referring to FIG. 5, there may be a number of signal lines PAD, which may be arranged along the first direction DR1. The plurality of signal lines PAD may include, for example, first signal lines PAD1, second signal lines PAD2 arranged with the first signal lines PAD1 therebetween, third signal lines PAD3 arranged with the second signal lines PAD2 and first signal lines PAD1 therebetween, fourth signal lines PAD4 arranged with the third signal lines PAD3, the second signal lines PAD2 and first signal lines PAD1 therebetween, and fifth signal lines PAD5 arranged with the fourth signal lines PAD4, the third signal lines PAD3, the second signal lines PAD2 and first signal lines PAD1 therebetween.

The first signal lines PAD1 may receive a data signal from the driving integrated circuit 390 to transfer the data signal to the thin-film transistors of the circuit layer 130 in the display area DA. The second signal lines PAD2 may receive a scan-high voltage from the driving integrated circuit 390 to transfer the signal to the gate driver 700 located in the non-display area NA. The third signal lines PAD3 may receive a scan-low voltage from the driving integrated circuit 390 to transfer the signal to the gate driver 700. The fourth signal lines PAD4 may receive an emission-high voltage from the second circuit board 500 to drive the emissive layer 450 and transfer the voltage to the emissive layer 150 in each of the pixels. The fifth signal lines PAD5 may receive an emission-low voltage from the second circuit board 500 to drive the emissive layer 150 and transfer the voltage to the emissive layer 150 in each of the pixels. The first to fifth signal lines PAD1 to PAD5 may be electrically connected to a gate signal line GSL as shown in FIG. 5.

Referring to FIGS. 6 and 7, the first lead line LE1 of the first line layer 320 may include a plurality of sub-lead lines LE11 to LE15.

The first sub-lead line LE11 may be coupled to the first signal line PAD1, the second sub-lead line LE12 may be coupled to the second signal line PAD2, the third sub-lead line LE13 may be coupled to the third signal line PAD3, the fourth sub-lead line LE14 may be coupled to the fourth signal line PAD4, and the fifth sub-lead line LE15 may be coupled to the fifth signal line PAD5.

The plurality of sub-lead lines LE11 to LE15 of the first line layer 320 may pass through the via holes VIA to form remaining lead lines RE_LE11 to RE_LE15 in the second circuit area CA2 and the third circuit area CA3. Specifically, the first sub-lead line LE11 may form the first remaining lead line RE_LE11, the second sub-lead line LE12 may form the second remaining lead line RE_LE2, the third sub-lead line LE13 may form the third remaining lead line RE_LE13, the fourth sub-lead line LE14 may form the fourth remaining lead line RE_LE14, and the fifth sub-lead line LE15 may form the fifth remaining lead line RE_LE15.

The remaining lead lines RE_LE11 to RE_LE15 may be exposed together on the inner side surfaces including the second longer side edge LEG2 of the first circuit board 300 as shown in FIG. 7.

The first, second and third remaining lead lines RE_LE11 to RE_LE13 may be electrically connected to the driving integrated circuit 390 as described later, while the fourth and fifth remaining lead lines RE_LE14 and RE_LE15 may be electrically connected directly to the second circuit board 500 without being electrically connected to the drive integrated circuit 390. That is to say, the first remaining lead line RE_LE11 may receive a data signal from the driving integrated circuit 390, the second remaining lead line RE_LE12 may receive a scan-high voltage from the driving integrated circuit 390, and the third remaining lead line RE_LE13 may receive a scan-low voltage from the driving integrated circuit 390. The fourth remaining lead line RE_LE14 may receive the emission-high voltage from the second circuit board 500 while the fifth remaining lead line RE_LE15 may receive the emission-low voltage from the second circuit board 500.

The second line layer 340 may include a plurality of sub-lead lines LE11a to LE15a. The plurality of sub-lead lines LE11 to LE15 may be connected to the plurality of sub-lead lines LE11a to LE15a of the second line layer 340 through the via holes VIA, respectively. Specifically, the first sub-lead line LE11 may be electrically connected to the sixth sub-lead line LE11a, the second sub-lead line LE12 may be electrically connected to the seventh sub-lead line LE12a, the third sub-lead line LE13 may be electrically connected to the eighth sub-lead line LE13a, the fourth sub-lead line LE14 may be electrically connected to the ninth sub-lead line LE14a, and the fifth sub-lead line LE15 may be electrically connected to the tenth sub-lead lines LE15a.

The sixth sub-lead line LE11a, the seventh sub-lead line LE12a and the eighth sub-lead line LE13a may be electrically connected to the driving integrated circuit 390, while the ninth sub-lead line LE14a and the tenth sub-lead line LE15a may be spaced apart from the driving integrated circuit 390 and may be electrically connected directly to the second circuit board 500.

The sixth sub-lead line LE11a may transfer a data signal and a data control signal from the driving integrated circuit 390 to the first sub-lead line LE11. The seventh sub-lead line LE12a may transfer a scan-high voltage from the drive integrated circuit 390 to the second sub-lead line LE12. The eighth sub-lead line LE13a may transfer a scan-low voltage from the drive integrated circuit 390 to the third sub-lead line LE13. The ninth sub-lead line LE14a may transfer an emission-high voltage from the second circuit board 500 to the fourth sub-lead line LE14. The tenth sub-lead line LE15a may transfer an emission-low voltage to the fifth sub-lead line LE15.

As shown in FIG. 6, each of the seventh sub-lead line LE12a and the eighth sub-lead line LE13a may have a first portion extended from the lower side of the driving integrated circuit 390 in the second direction DR2, a second portion connected to the first portion and extended to the right in the first direction DR1, and a third portion connected to the second portion and extended upward in the second direction DR2.

The second line layer 340 may further include a plurality of second lead lines LE21 to LE25. The second lead lines LE21 to LE25 may be coupled with the plurality of circuit signal lines C_PAD of the second circuit board 500.

The 2-1 sub-lead line LE21 may receive a data signal and a data control signal from the second circuit board 500 to transfer the signals to the driving integrated circuit 390. The 2-4 sub-lead line LE24 may receive the emission-high voltage from the second circuit board 500 to apply the voltage directly to the ninth sub-lead line LE14a. The 2-5 sub-lead line LE25 may receive the emission-low voltage from the second circuit board 500 to apply the voltage directly to the tenth sub-lead line LE15a.

On the other hand, the 2-2 and 2-3 sub-lead lines LE22 and LE23 may be dummy lead lines that are physically coupled to the second circuit board 500 but are not electrically connected to the second circuit board 500.

That is to say, as described above, the driving integrated circuit 390 according to some example embodiments of the present disclosure includes the gate driving chip in which scan driving circuits that generate the scan-high voltage, the scan-low voltage and the scan control signal to transfer them to the gate driver 700 located in the non-display area NA are integrated. In such case, even if there is no structure corresponding to the gate driving chip on the second circuit substrate 500, the scan-high voltage, the scan-low voltage and the like can be applied directly to the gate driver 700 in the non-display area NA through the gate driving chip incorporated in the driving integrated circuit 390.

For example, the 2-2 sub-lead line LE22 may include a 2-2a sub-lead line LE22a extended downward from the driving integrated circuit 390 in the second direction DR2, and the 2-2b sub-lead line LE22b separated from the 2-2a sub-lead line LE22a in the second direction DR2. The 2-2a sub-lead line LE22a may be physically connected to the driving integrated circuit 390, and the 2-2b sub-lead line LE22b may be coupled to a circuit signal line of the second circuit board 500. The 2-2a sub-lead line LE22a and the 2-2b sub-lead line LE22b may be connected and then may be arbitrarily cut to be separated from each other.

The 2-2a sub-lead line LE22a may protrude from the seventh sub-lead line LE12a downward in the second direction DR2, that is, toward the second circuit substrate 500, as shown in FIG. 6. According to some example embodiments, the seventh sub-lead line LE12a may protrude from the 2-2a sub-lead line LE22a downward in the second direction DR2, i.e., toward the second circuit board 500 or may be located on the same line, e.g., on the line extended in the first direction DR1 depending on the cutting location of the 2-2a sub-lead line LE22a and the 2-2b sub-lead line LE22b.

The 2-2a sub-lead line LE22a and the 2-2b sub-lead line LE22b may overlap with each other in the second direction DR2. In other words, the 2-2b sub-lead line LE22b may be located on the line extended from the 2-2a sub-lead line LE22a from the driving integrated circuit 390.

Because the 2-2b sub-lead line LE22b is separated from the 2-2a sub-lead line LE22a, the 2-2a sub-lead line LE22a and the 2-2b sub-lead line LE22b may work as dummy lines in which substantially no electric current flows.

Likewise, the 2-3 sub-lead line LE23 may include a 2-3a sub-lead line LE23a extended downward from the driving integrated circuit 390 in the second direction DR2, and the 2-3b sub-lead line LE23b separated from the 2-3a sub-dead line LE23a in the second direction DR2, The 2-3a sub-lead line LE23a may be physically connected to the driving integrated circuit 390, and the 2-3b sub-lead line LE23b may be coupled to the circuit signal line of the second circuit board 500, The 2-3a sub-lead line LE23a and the 2-3b sub-lead line LE23b may be connected and then may be arbitrarily cut to be separated from each other.

The 2-3a sub-lead line LE23a may protrude from the eighth sub-lead line LE13a downward in the second direction DR2, that is, toward the second circuit substrate 500, as shown in FIG. 6. According to some example embodiments, the eighth sub-lead line LE13a may protrude from the 2-3a sub-lead line LE23a downward in the second direction DR2, i.e., toward the second circuit board 500 or may be located on the same line, e.g., on the line extended in the first direction DR1 depending on the cutting location of the 2-3a sub-lead line LE23a and the 2-3b sub-lead line LE23b.

The 2-3a sub-lead line LE23a and the 2-3b sub-lead line LE23b may overlap with each other in the second direction DR2. In other words, the 2-3b sub-lead line LE23b may be located on the line extended from the 2-3a sub-lead line LE23a from the driving integrated circuit 390.

Because the 2-3b sub-lead line LE23b is separated from the 2-3a sub-lead line LE23a, the 2-3a sub-lead line LE23a and the 2-3b sub-lead line LE23b may work as dummy lines in which substantially no electric current flows.

As described above, the emission-high voltage is applied to the 2-4 sub-lead line LE24 from the second circuit board 500. In the first circuit board 300 according to some example embodiments of the present disclosure; the 2-3a sub-lead line LE23a and the 2-3b sub-lead line LE23b of the 2-3 sub-lead line LE23 are separated from each other to serve as dummy lines. Accordingly, it may be possible to prevent or reduce instances of a short-circuit due to a potential difference between the 2-4 sub-lead line LE24 and the 2-3 sub-lead line LE23.

Likewise, because the 2-2a sub-lead line LE22a and the 2-2b sub-lead line LE22b of the 2-2 sub-lead line LE22 are separated from each other and serve as the dummy lines, it may be possible to prevent or reduce a short-circuit due to a potential difference with the adjacent 2-3 sub-lead line LE23.

Figure 8:
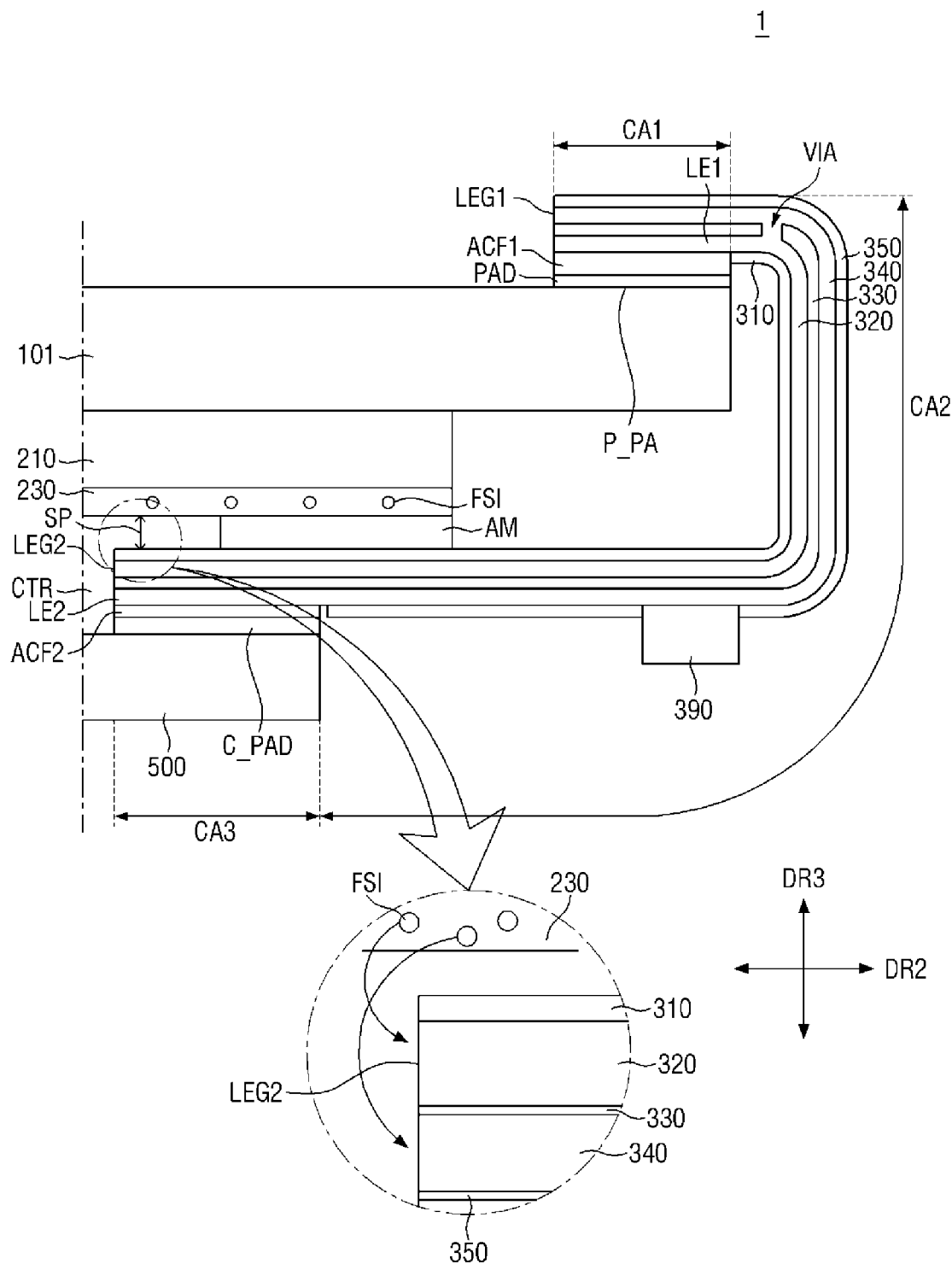
FIG. 8 is a cross-sectional view showing an example where the additive ions penetrate into the first line layer through the cover insulating layer of the cover panel sheet.
Figure 9:
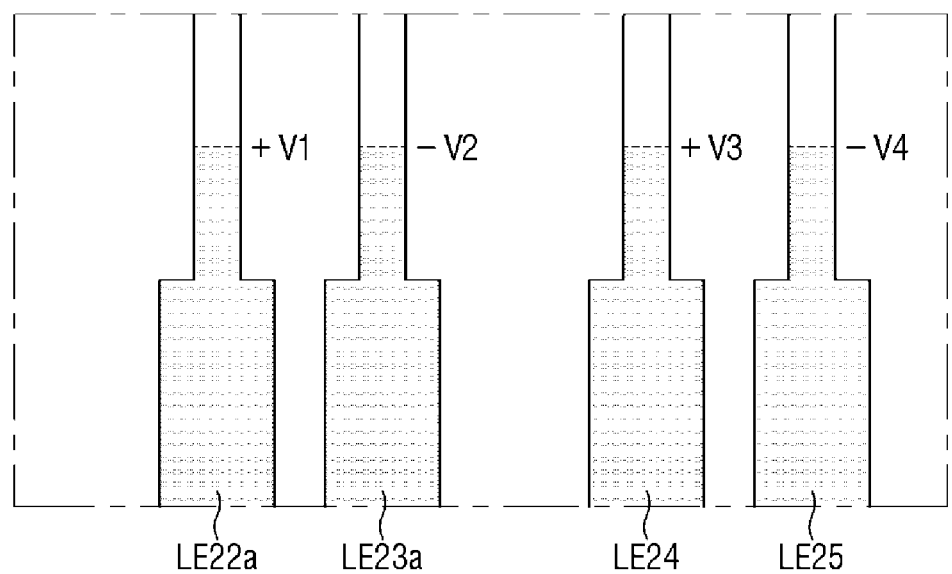
FIGS. 9 and 10 are schematic views showing an example of preventing a short-circuit between the lines by way of curing a part of the second line layer of the first circuit board.
Figure 10:
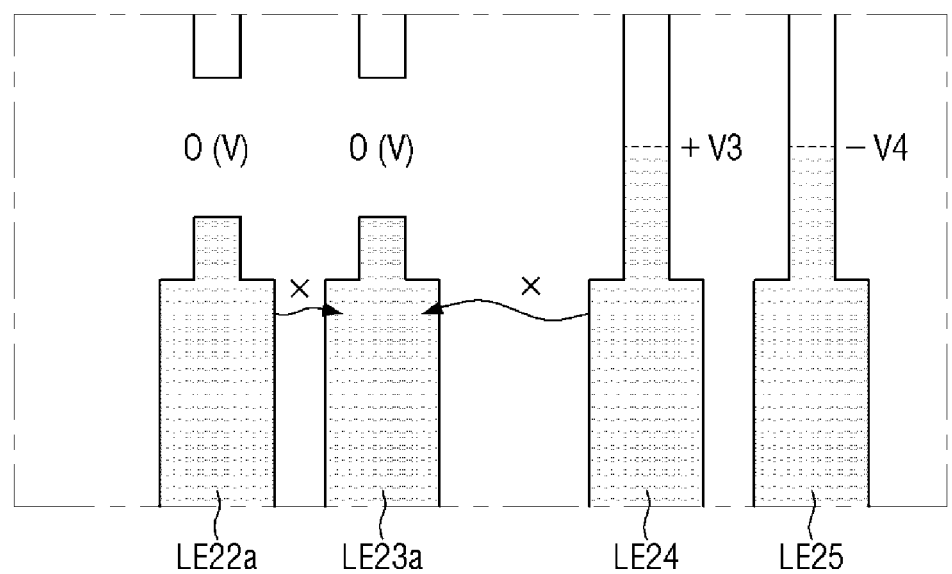

FIG. 8 is a cross-sectional view showing an example where the additive ions penetrate into the first line layer through the cover insulating layer of the cover panel sheet. FIGS. 9 and 10 are schematic views showing an example of preventing a short-circuit between the lines by way of curing a part of the second line layer of the first circuit board. In the example shown in FIG. 9, the 2-2 sub-lead line LE22 and the 2-3 sub-lead line LE23 of the second line layer 340 of the first circuit board 300 are not formed as dummy lines but are electrically connected to the second circuit board 500 so that electric currents flow in them. In the example shown in FIG. 10, they are formed as the above-described dummy lines.

Referring to FIG. 8, the cover insulating layer 230 further includes the additive ions FSI to improve the insulation, as described above. The additive ions FSI may be eluted out of the cover insulating layer 230 through external moisture in the environment of high temperature and high humidity. Once the additive ions FSI are eluted, they may corrode the first line layer 320 and the second line layer 340 of the first circuit board 300. For example, as shown in FIG. 8, the eluted additive ions FSI may penetrate into the sub-lead lines LE21 to LE25 of the second line layer 340 through the exposed inner side surface of the second line layer 340 of the first circuit board 300.

Referring to FIG. 9, a scan-high voltage +V1 is applied to the 2-2a sub-lead line LE22a, a scan-low voltage −V2 is applied to the 2-3a sub-lead line LE23a, an emission-high voltage +V3 is applied to the 2-4 sub-lead line LE24, and an emission-low voltage −V4 is applied to the 2-5 sub-lead line LE25. For example, the scan-high voltage +V1 and the emission-high voltage +V3 may be positive values, while the scan-low voltage −V2 and the emission-low voltage −V4 may be negative values. The voltages are measured in volts (V).

The 2-2a sub-lead line LE22a, the 2-3a sub-lead line LE23a, the 2-4 sub-lead line LE24 and the 2-5 sub-lead line LE25 may be corroded by the additive ions FSI penetrating through the exposed surfaces.

As described above, the scan-high voltage +V1 is applied to the 2-2a sub-lead line LE22a and the scan-low voltage −V2 is applied to the 2-3a sub-lead line LE23a. If the 2-2a sub-lead line LE22a has been corroded, the constituent materials of the 2-2a sub-lead line LE22a (in the ion state) may be eluted out of it through the ambient moisture. The constituent materials of the 2-2a sub-lead line LE22a (in the ion state) may move toward the adjacent 2-3a sub-lead line LE23a due to the additive ions FSI. As a result, a short circuit may occur between the 2-2a sub-lead line LE22a and the 2-3a sub-lead line LE23a, such that a defect may occur in the lines of the display device 1.

Likewise, the emission-high voltage +V3 is applied to the 2-4 sub-lead line LE24. If the 2-2a sub-lead line LE22a has been corroded, the constituent materials of the 2-2a sub-lead line LE22a (in the ion state) may be eluted out of it through the ambient moisture. The constituent materials (in the ion state) of the 2-2a sub-lead line LE22a may move toward the adjacent 2-4 sub-lead line LE24 due to the additive ion FSI. As a result, a short circuit may occur between the 2-2a sub-lead line LE22a and the 2-4 sub-lead line LE24, such that a defect may occur in the lines of the display device 1.

In contrast, in the first circuit board 300 of the display device 1 according to some example embodiments shown in FIG. 10, the 2-2 sub-lead line LE22 and the 2-3 sub-lead line LE23 are formed as dummy lines, and thus 0V may be applied to the 2-2a sub-lead line LE22*a* and the 2-3a sub-lead line LE23*a*. By doing so, it may be possible to prevent or reduce instances of a short-circuit that may occur between the 2-2a sub-lead line LE22*a* and the 2-3a sub-lead line LE23*a* or between the 2-2a sub-lead line LE22*a* and the 2-4 sub-lead line LE24, thereby preventing or reducing instances of a defect in the lines of the display device 1.

Hereinafter, display devices according to some example embodiments of the present disclosure will be described in more detail. In the following description, the same or similar elements will be denoted by the same or similar reference numerals, and redundant descriptions will be omitted or briefly described.

Figure 11:
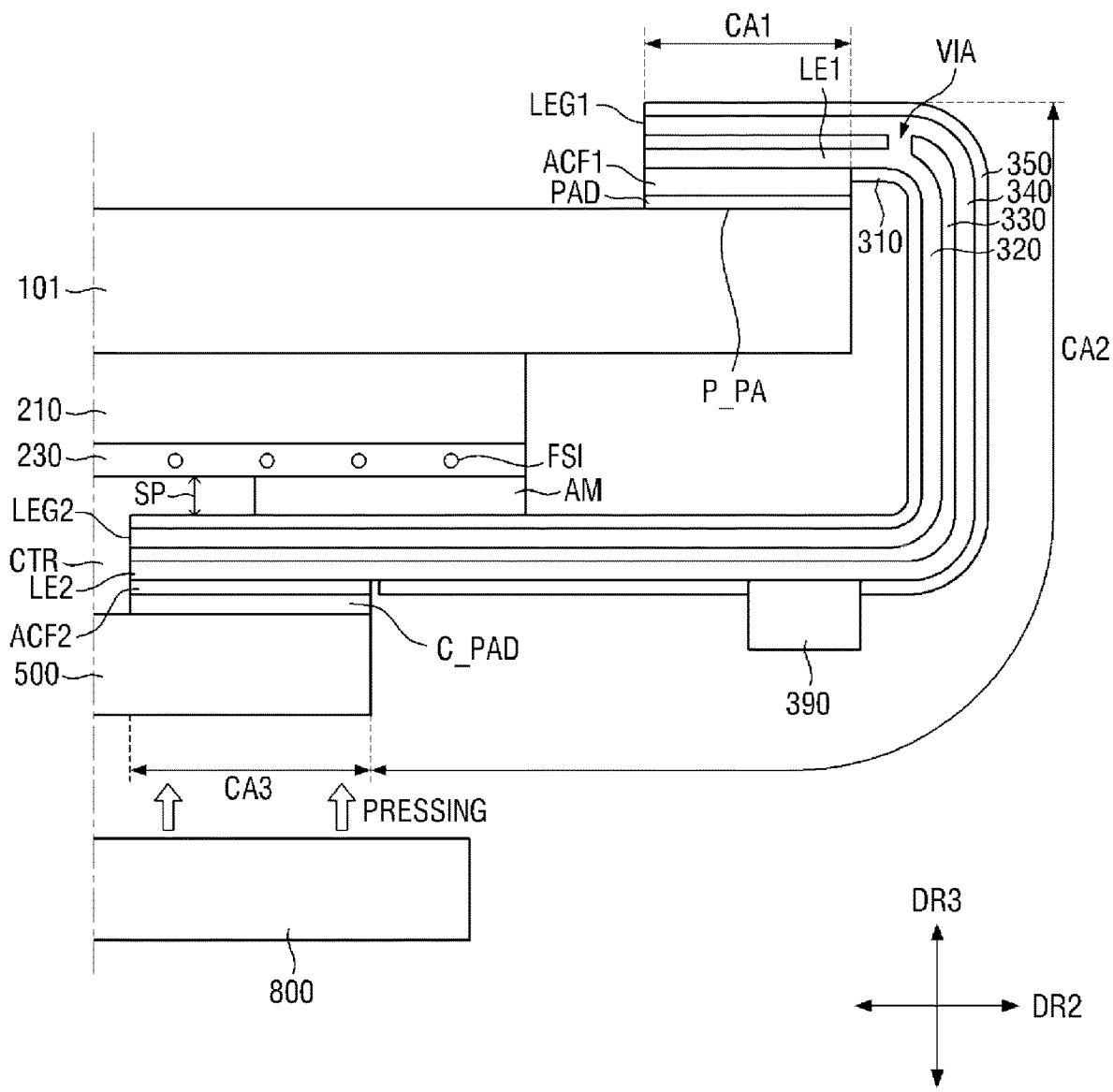
FIG. 11 is a cross-sectional view showing that a pressurizing apparatus is located below the first and second circuit boards to press a cover adhesive layer.
Figure 12:
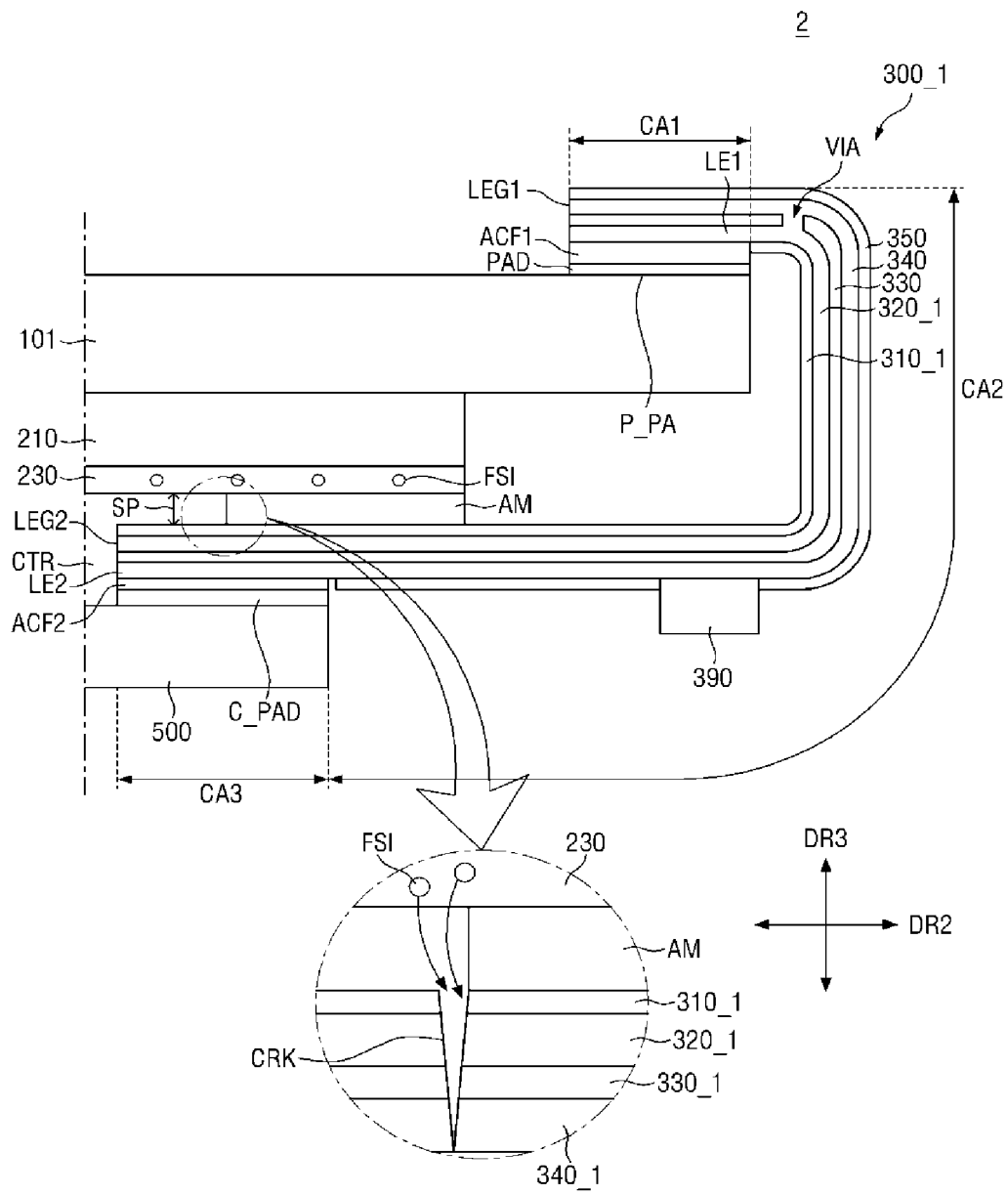
FIG. 12 is a cross-sectional view of a display device according to some example embodiments of the present disclosure e.
Figure 13:
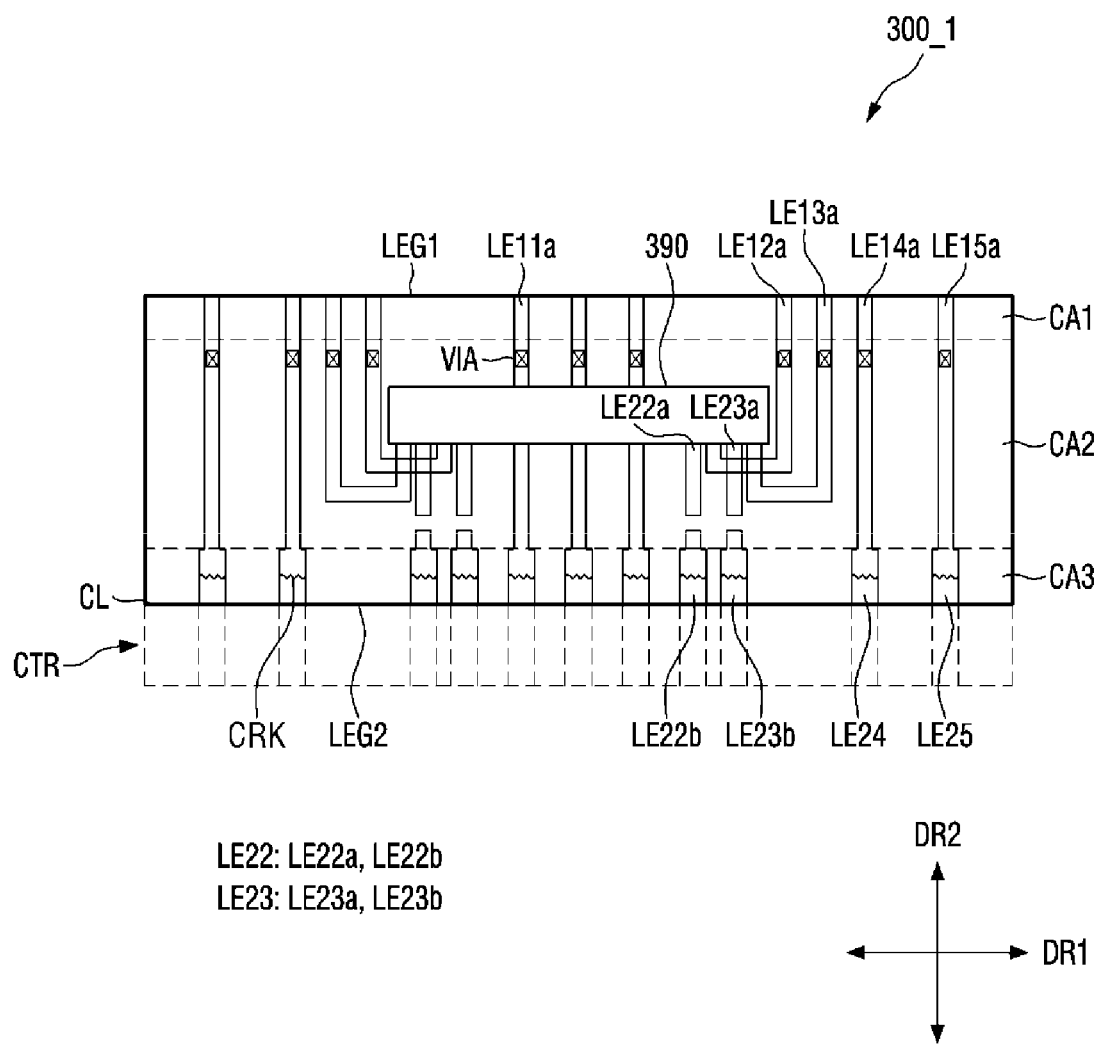
FIG. 13 is a plan view showing the layout of a first line layer of a first circuit board according to some example embodiments of the present disclosure.
Figure 14:
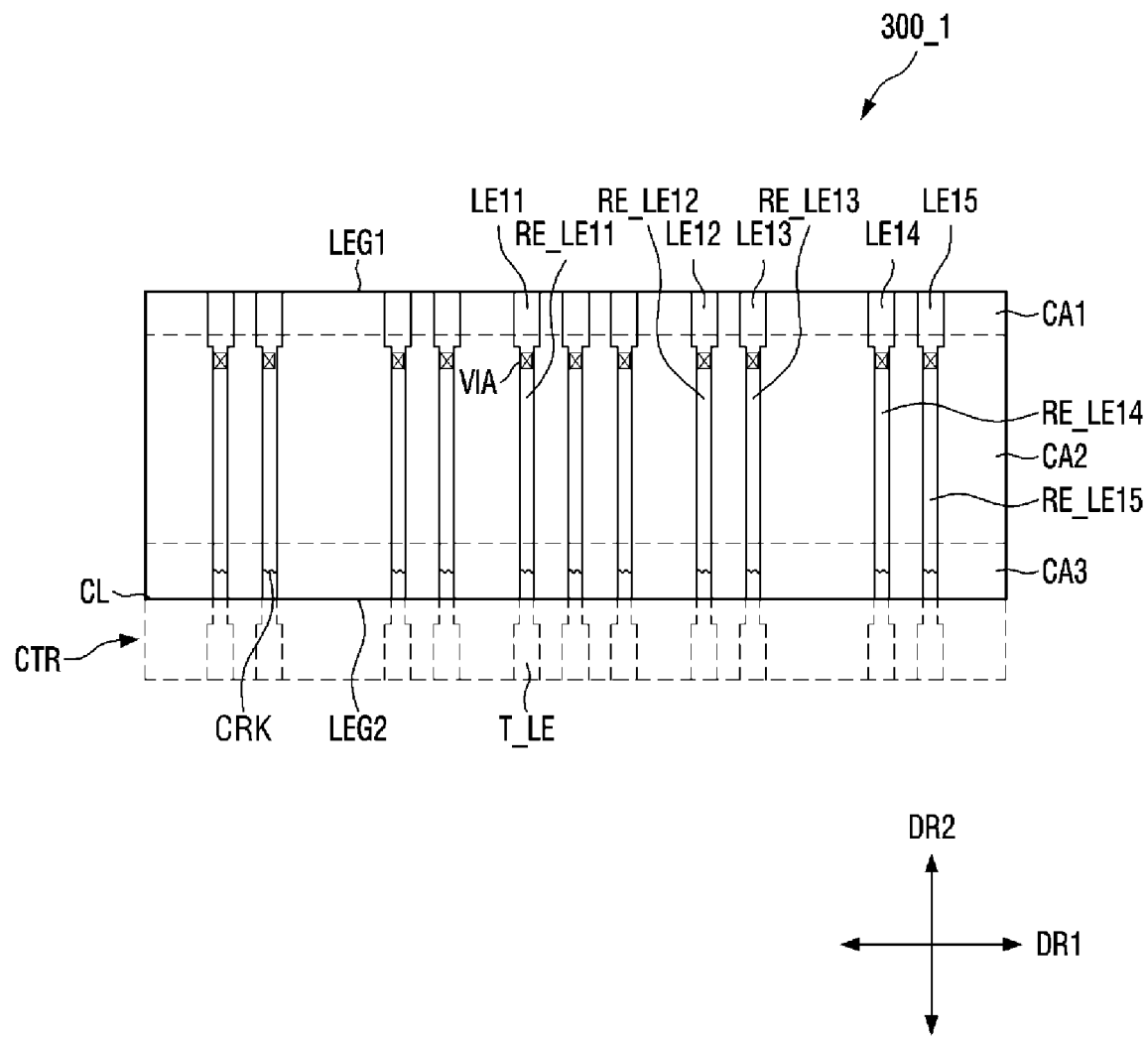
FIG. 14 is a plan view showing the layout of a second line layer and a driving integrated circuit according to some example embodiments of the present disclosure e.

FIG. 11 is a cross-sectional view showing that a pressurizing apparatus is located below the first and second circuit boards to press a cover adhesive layer. FIG. 12 is a cross-sectional view of a display device according to some example embodiments of the present disclosure. FIG. 13 is a plan view showing the layout of a first line layer of a first circuit board according to some example embodiments of the present disclosure. FIG. 14 is a plan view showing the layout of a second line layer and a driving integrated circuit of a first circuit board according to some example embodiments of the present disclosure.

A display device 2 according to some example embodiments shown in FIGS. 11 to 14 is different from the display device 1 described above in that cracks CRK are formed in a first protective organic layer 310_1 and a first line layer 320_1 of a first circuit board 300_1.

For example, cracks CRK may be formed on the first protective organic layer 310_1, the first line layer 320_1, the lead insulating layer 330_1 and the second line layer 330_1 of the first circuit board 300_1 of the display device 2 according to some example embodiments of the present disclosure.

As shown in FIG. 11, a pressurizing apparatus 800 is placed below a second circuit board 500. The pressurizing apparatus 800 may press the lower surface of the second circuit board 500 to couple a first circuit board 300_1 with the cover panel sheet 200 by an inter-module coupling member AM.

As shown in FIG. 12, by pressing the lower surface of the second circuit board 500 with the pressurizing apparatus 800, cracks CRK may be formed on the first protective organic layer 310_1, the first line layer 320_1, the lead insulating layer 330_1 and the second line layer 340_1.

As described above, the inner side surface of the inter-module coupling member AM may be located more to the outside than the inner side surface of the first circuit board 300_1. In other words, the inner side surface of the first circuit board 300 may protrude toward the inner side than the inter-module coupling member AM. Accordingly, the protruding part of the first circuit board 300_1 may be spaced apart from the cover panel sheet 200 by a spacing SP.

By pressing the lower surface of the second circuit board 500 with the pressurizing apparatus 800, cracks CRK may be formed on the first protective organic layer 310_1, the first line layer 320_1, the lead insulating layer 330_1 and the second line layer 340_1 by the protruding part of the first circuit board 300_1.

The first protective organic layer 310_1, the first line layer 320_1, the lead insulating layer 330_1 and the second line layer 340_1 may be formed around the inner side surface of the inter-module member AM when viewed from a plan view.

As described above, the additive ions FSI in the cover insulating layer 230 may be eluted out of the cover insulating layer 230 through the external moisture in an environment of high temperature and high humidity. If the additive ions FSI are eluted, they may corrode the first line layer 320_1 and the second line layer 340_1 of the adjacent first circuit board 300. When cracks CRK are formed in the first protective organic layer 310_1, the first line layer 320_1, the lead insulating layer 330_1 and the second line layer 340_1, the additive ions FSI may penetrate through the surfaces of the first line layer 320_1 and the second line layer 340_1 that face the cover panel sheet 200 as well as the exposed inner side surfaces of the second line layer 340_1 and the second line layer 340_1 of the first circuit board 300. As a result, the plurality of remaining lead lines of the first line layer 320_1 adjacent to the cutting line CTL and the plurality of second lead lines of the second line layer 340_1 may gradually corrode.

As described above with reference to FIGS. 9 and 10, the scan-high voltage +V1 is applied to the 2-2a sub-lead line LE22*a* and the scan-low voltage −V2 is applied to the 2-3a sub-lead line LE23*a*. If the 2-2a sub-lead line LE22*a* has been corroded, the constituent materials of the 2-2a sub-lead line LE22*a* (in the ion state) may be eluted out of it through the ambient moisture. The constituent materials of the 2-2a sub-lead line LE22*a* (in the ion state) may move toward the adjacent 2-3a sub-lead line LE23*a* due to the additive ions FSI. As a result, a short circuit may occur between the 2-2a sub-lead line LE22*a* and the 2-3a sub-lead line LE23*a*, such that a defect may occur in the lines of the display device 2.

Likewise, the emission-high voltage +V3 is applied to the 2-4 sub-lead line LE24. If the 2-2a sub-lead line LE22*a* has been corroded, the constituent materials of the 2-2a sub-lead line LE22*a* (in the ion state) may be eluted out of it through the ambient moisture. The constituent materials (in the ion state) of the 2-2a sub-lead line LE22*a* may move toward the adjacent 2-4 sub-lead line LE24 due to the additive ion FSI. As a result, a short circuit may occur between the 2-2a sub-lead line LE22*a* and the 2-4 sub-lead line LE24, such that a defect may occur in the lines of the display device 2.

In contrast, in the first circuit board 300_1 of the display device 2 according to some example embodiments, as shown in FIG. 10, the 2-2 sub-lead line LE22 and the 2-3 sub-lead line LE23 are formed as dummy lines, and thus 0V may be applied to the 2-2a sub-lead line LE22*a* and the 2-3a sub-lead line LE23*a*. By doing so, it may be possible to prevent or reduce instances of a short-circuit that may occur between the 2-2a sub-lead line LE22*a* and the 2-3a sub-lead line LE23*a* or between the 2-2a sub-lead line LE22*a* and the 2-4 sub-lead line LE24, thereby preventing a defect in the lines of the display device 2.

Figure 15:
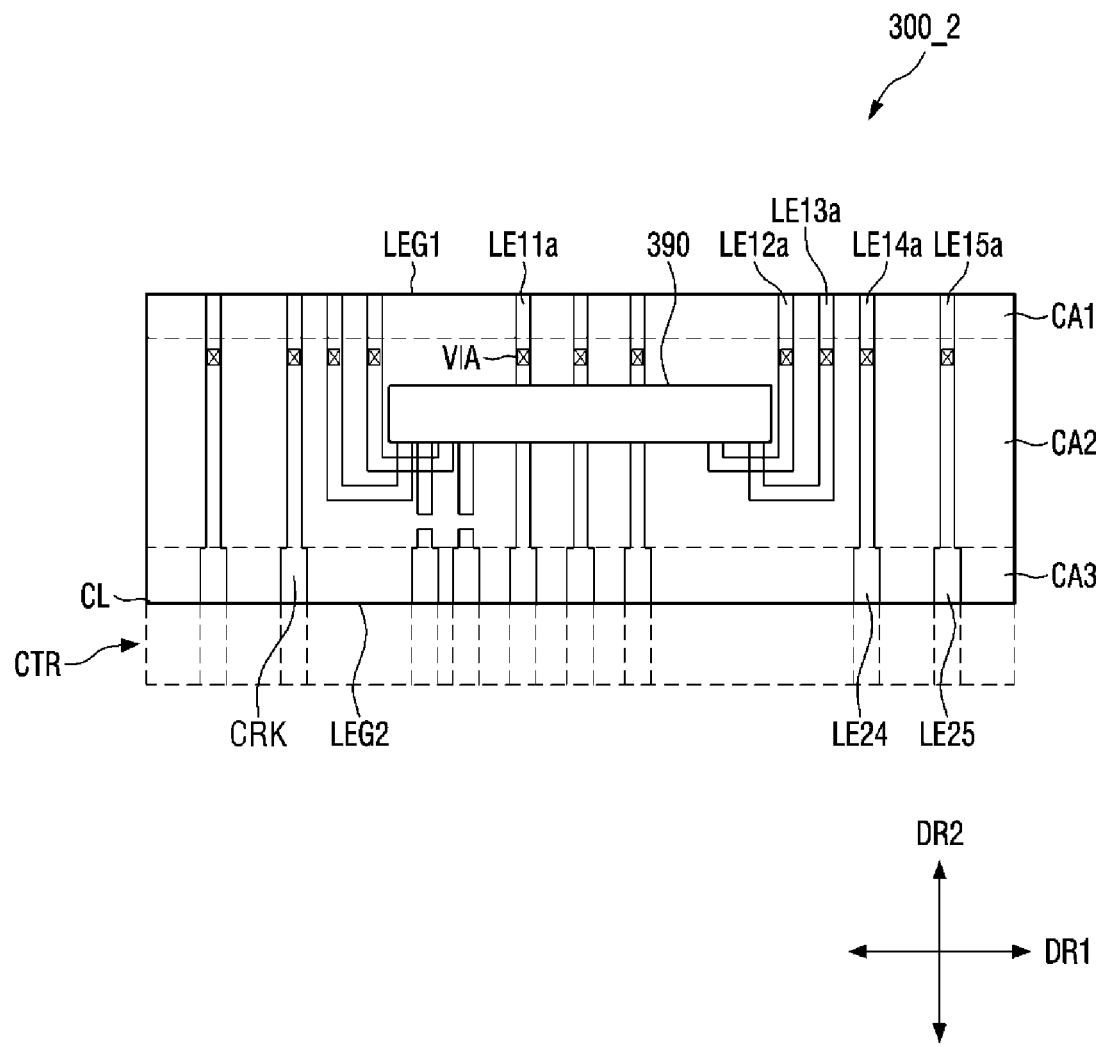
FIG. 15 is a plan view showing the layout of a second line layer and a driving integrated circuit of a first circuit board according to some example embodiments of the present disclosure.

FIG. 15 is a plan view showing the layout of a second line layer and a driving integrated circuit of a first circuit board according to some example embodiments of the present disclosure.

A first circuit board 300_2 according to some example embodiments shown in FIG. 15 is different from the first circuit board 300 in that the 2-2 lead line LE22 and the 2-3 lead line LE23 are not located.

For example, in a first circuit board 300_2, according to some example embodiments of the present disclosure, the 2-2 lead line LE22 and the 2-3 lead line LE23 among the second lead lines may not be located. Thus, a process of cutting the 2-2 lead line LE22 and the 2-3 lead line LE23 may not be performed, and it may be possible to prevent or reduce instances of a short circuit between the 2-2 lead line LE22 and the 2-3 lead line LE23 and between 2-3 lead line LE23 and the 2-4 lead line LE24.

Figure 16:
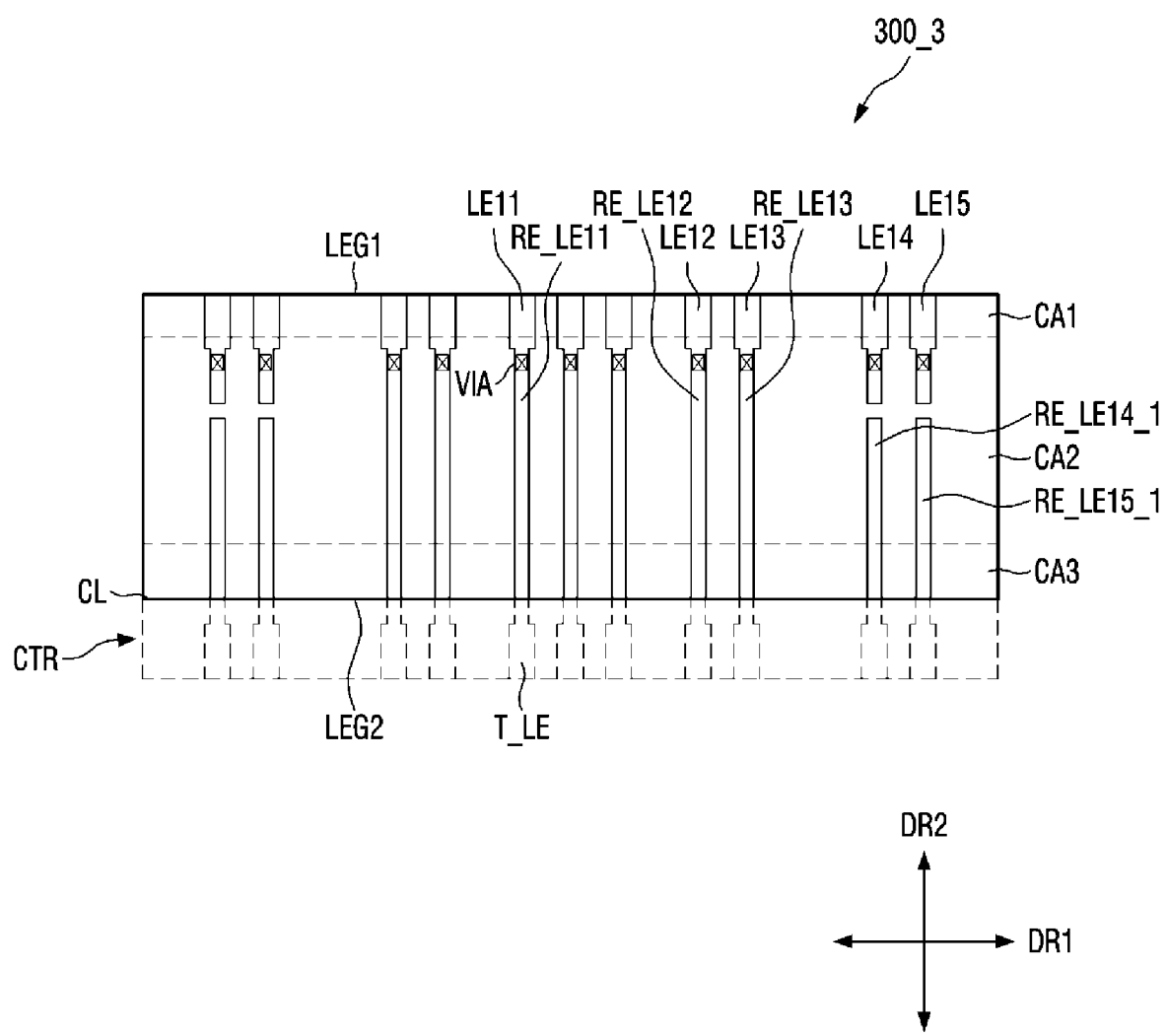
FIG. 16 is a plan view showing the layout of a first line layer of a first circuit board according to some example embodiments of the present disclosure.

FIG. 16 is a plan view showing the layout of a first line layer of a first circuit board according to some example embodiments of the present disclosure.

Referring to FIG. 16, a first circuit board 300_3 according to some example embodiments of the present disclosure is different from the first circuit board 300 according to some example embodiments in that a fourth sub-lead line LE14 is physically separated from a fourth remaining lead line RE_LE14_1 and a fifth sub-lead line LE15 is physically separated from a fifth remaining lead line RE_LE15_1 so that they are electrically insulated.

For example, in the first circuit board 300_3 according to some example embodiments of the present disclosure, the fourth sub-lead line LE14 is physically separated from the fourth remaining lead line RE_LE14_1 and the fifth sub-lead line LE15 is physically separated from the fifth remaining lead line RE_LE15_1 so that they may be electrically insulated.

As described above, the emission-high voltage and the emission-low voltage are applied to the fourth remaining lead line and the fifth remaining lead line, respectively. Because the fourth sub-lead line LE14 is physically separated from the fourth remaining lead line RE_LE14_1 and the fifth sub-lead line LE15 is physically separated from the fifth remaining lead line RE_LE15_1 according to some example embodiments, it may be possible to prevent or reduce instances of a short circuit between the fourth remaining lead line RE_LE14_1 and the fifth remaining lead line RE_LE15_1. Further, a scan-low voltage is applied to the third remaining lead line RE_LE13. Because the fourth remaining lead line RE_LE14_1 serves as a dummy line, it may be possible to prevent or reduce instances of a short circuit between the fourth remaining lead line RE_LE14_1 and the third remaining lead line RE_LE13.

Figure 17:
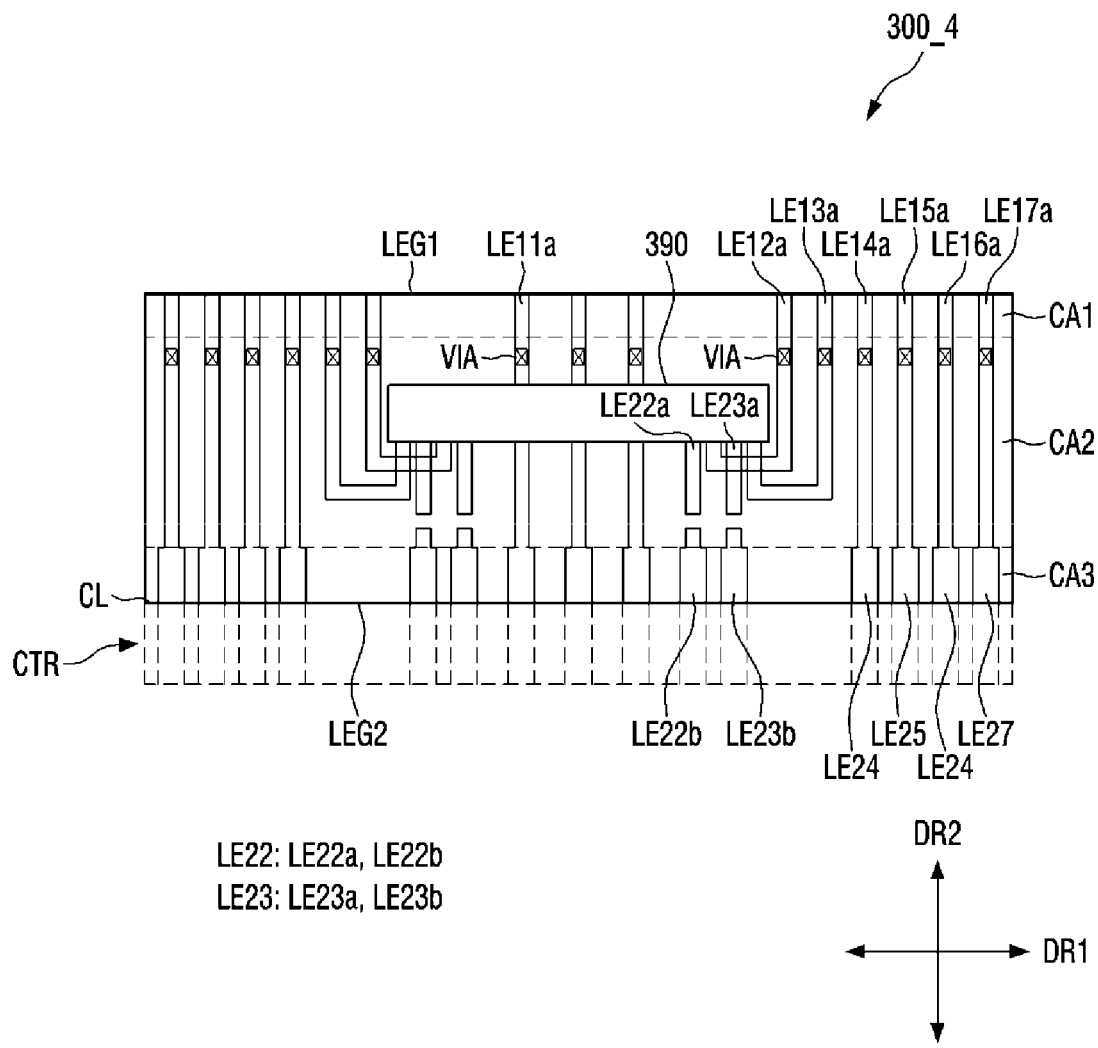
FIG. 17 is a plan view showing the layout of a second line layer and a driving integrated circuit according to some example embodiments of the present disclosure e.
Figure 18:
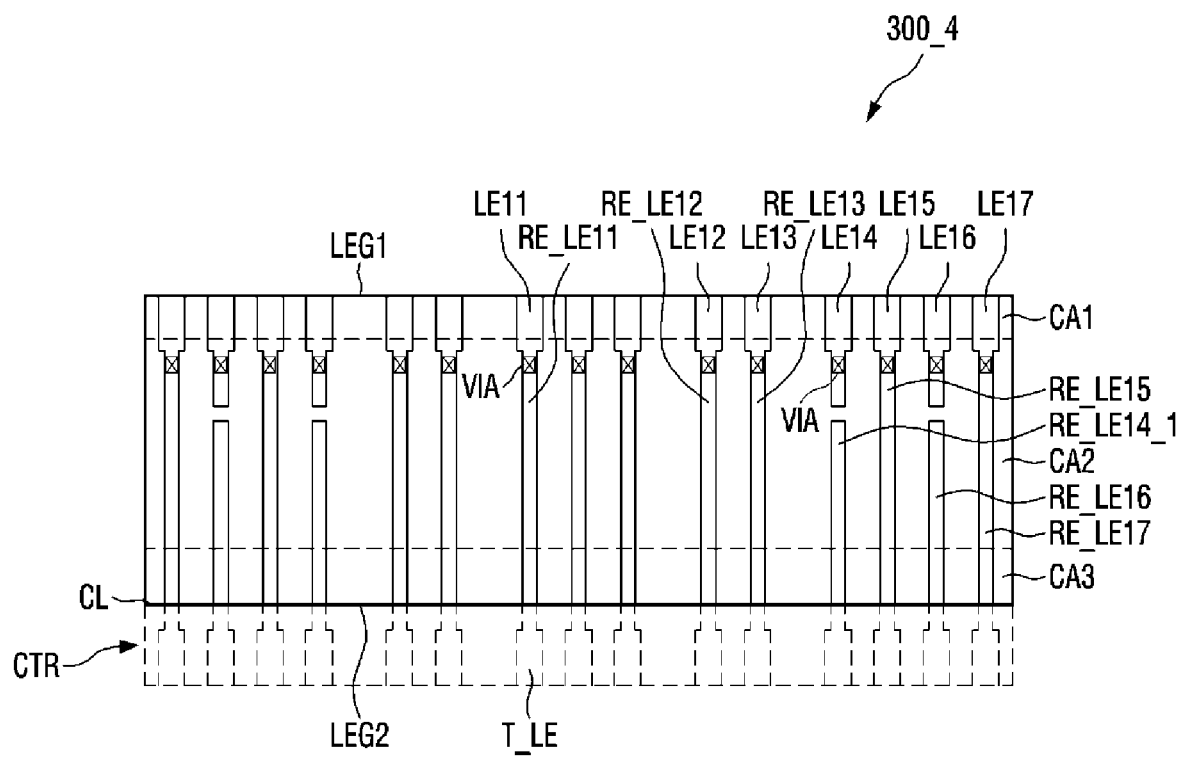
FIG. 18 is a plan view showing the layout of a first line layer of a first circuit board according to some example embodiments of the present disclosure.

FIG. 17 is a plan view showing the layout of a second line layer and a driving integrated circuit according to some example embodiments of the present disclosure. FIG. 18 is a plan view showing the layout of a first line layer of a first circuit board according to some example embodiments of the present disclosure.

A first circuit board 300_4 according to some example embodiments of the present disclosure may be different from the first circuit board 300_3 according to some example embodiments, as shown in FIG. 16, in that only a fourth sub-lead line LE14 is separated from a fourth remaining lead line RE_LE14_1 but a fifth sub-lead line LE15 is not separated from a fifth remaining lead line RE_LE15_1.

For example, the first circuit board 300_4 according to some example embodiments of the present disclosure may further include an eleventh sub-lead line LE16 spaced apart from the fourth sub-lead line LE14 with the fifth sub-lead line LE15 therebetween, and a twelfth sub-lead line LE17 spaced apart from the fifth sub-lead line LE15 with the eleventh sub-lead line LE16 therebetween. The eleventh sub-lead line LE16 may perform substantially the same function as the fourth sub-lead line LE14, and the twelfth sub-lead line LE17 may perform substantially the same function as the fifth sub-lead line LE15.

Likewise, the first circuit board 300_4 may include a sixth remaining lead line RE_LE16_1 that is adjacent to the eleventh sub-lead line LE16 in the second direction DR2, and a seventh remaining lead line RE_LE17_1 that is adjacent to the twelfth sub-lead line LE17 in the second direction DR2.

In addition, the first circuit board 300_4 may further include a thirteenth sub-lead line LE16a spaced apart from the ninth sub-lead line LE14a with the tenth sub-lead line LE15a therebetween, and the fourteenth sub-lead line LE17a spaced apart from the tenth sub-lead line LE15a with the thirteenth lead line LE16a. The first circuit board 300_4 may further include a 2-6 sub-lead line LE26 that is adjacent to the thirteenth sub-lead line LE16a in the second direction DR2, and a 2-7 sub-lead line LE27 that is adjacent to the fourteenth sub-lead line LE17a in the second direction DR2.

According to some example embodiments of the present disclosure, the fourth sub-lead line LE14 and the eleventh sub-lead line LE16 may be physically separated from the fourth remaining lead line RE_LE14_1 and the sixth remaining lead line RE_LE16 adjacent to them in the second direction DR2, respectively. Accordingly, the fourth remaining lead line RE_LE14_1 and the sixth remaining lead line RE_LE16 may serve as dummy lines, while the fifth sub-lead line LE15 and the fifth remaining lead line RE_LE15 may be physically and electrically connected with each other, and the seventh sub-lead line LE17 and the seventh remaining lead line RE_LE17 may be physically and electrically connected with each other.

The fourth sub-lead line LE14 and the eleventh sub-lead line LE16 may be physically separated from the fourth remaining lead line RE_LE14_1 and the sixth remaining lead line RE_LE16 adjacent to them in the second direction DR2, respectively. Accordingly, it is possible to prevent or reduce instances of a short-circuit between the fifth remaining lead line RE_LE15 and the seventh remaining lead line RE_LE17.

According to some example embodiments, of the sub-lead lines to which the scan-high voltage is applied may be electrically insulated from the remaining lead lines adjacent to them in the second direction DR2 as described above, while the others may be electrically connected to the remaining lead lines adjacent to them in the second direction DR2. In other words, not all of the sub-lead lines to which the scan-high voltage is applied may be electrically insulated from the remaining lead lines adjacent to them in the second direction DR2.

Figure 19:
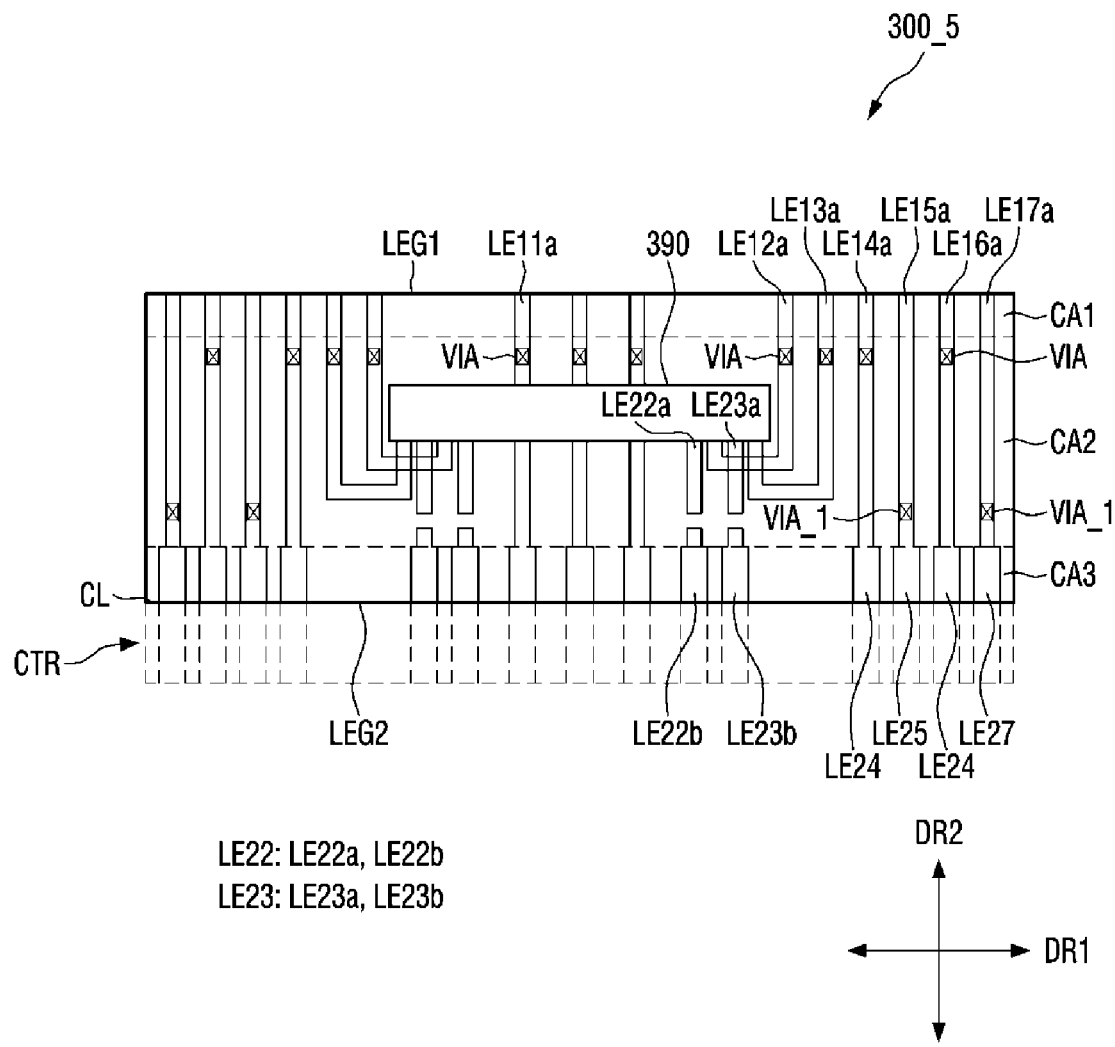
FIG. 19 is a plan view showing the layout of a second line layer and a driving integrated circuit of a first circuit board according to some example embodiments of the present disclosure.
Figure 20:
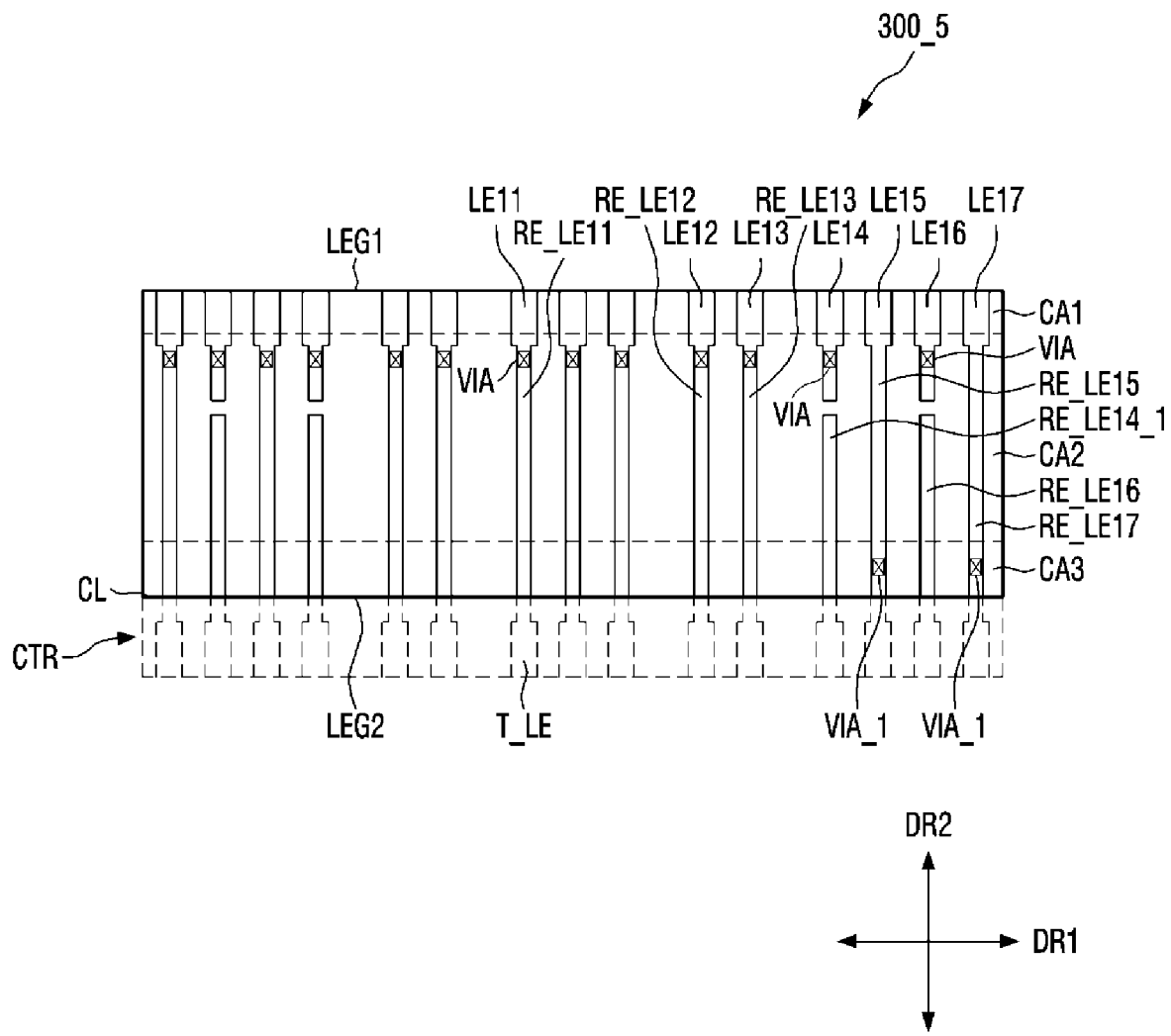
FIG. 20 is a plan view showing the layout of a first line layer of a first circuit board according to some example embodiments of the present disclosure.

FIG. 19 is a plan view showing the layout of a second line layer and a driving integrated circuit of a first circuit board according to some example embodiments of the present disclosure. FIG. 20 is a plan view showing the layout of a first line layer of a first circuit board according to some example embodiments of the present disclosure.

A first circuit board 300_5 according to some example embodiments, as shown in FIGS. 19 and 20, may be different from that of the example embodiment shown in FIGS. 17 and 18 in that the via hole VIA for connecting the fourth sub-lead line LE14 with the ninth sub-lead line LE14a and the via hole VIA for connecting the sixth sub-lead line LE16 with the eleventh sub-lead line LE16a are farther from the second circuit board 500 than a first via hole VIA_1 for connecting the fifth sub-lead line LE15 with the tenth sub-lead line LE15a, and a first via hole VIA_1 for connecting the seventh sub-lead line LE17 with the twelfth sub-lead line LE17a, respectively.

For example, in the first circuit board 300_5 according to some example embodiments, the first via hole VIA_1 for connecting the fifth sub-lead line LE15 with the tenth sub-lead line LE15a and the first via hole VIA_1 for connecting the seventh sub-lead line LE17 with the twelfth sub-lead line LE17a may be closer to the second circuit board 500 than the via hole VIA for connecting the fourth sub-lead line LE14 with the ninth sub-lead line LE14a and the via hole VIA for connecting the sixth sub-lead line LE16 with the eleventh sub-lead line LE16a, respectively, when viewed from a plan view.

Accordingly, it may be possible to reduce the risk of short-circuit between the via hole VIA and the first via hole VIA_1 adjacent to each other.

Moreover, the fourth sub-lead line LE14 and the eleventh sub-lead line LE16 may be physically separated from the fourth remaining lead line RE_LE14_1 and the sixth remaining lead line RE_LE16 adjacent to them in the second direction DR2, respectively. By doing so, it may be possible to prevent or reduce instances of a short-circuit between the fifth lead line RE_LE15 and the seventh lead line RE_LE17.

The foregoing is illustrative of example embodiments and is not to be construed as limiting thereof. Although a few example embodiments have been described, those skilled in the art will readily appreciate that many modifications are possible in the example embodiments without materially departing from the novel teachings and characteristics of the present invention. Accordingly, all such modifications are intended to be included within the scope of the present invention as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and their equivalents.

What is claimed is:

1. A display device comprising:
    a display panel comprising a display area and a panel pad area around the display area;
    a first circuit board having a first end attached to the panel pad area; and
    a second circuit board attached to a second end of the first circuit board,
        wherein the panel pad area comprises a plurality of panel signal lines,
        wherein the second circuit board comprises a plurality of circuit signal lines,
    wherein the first circuit board comprises:
    a first line layer coupled with the plurality of panel signal lines, the first line layer comprising a plurality of first lead lines,
    an insulating layer on the first line layer and comprising via holes,
    a second line layer on the insulating layer, at least a first part of the second line layer electrically connected to the first line layer through the via holes, and
    a driving integrated circuit on the second line layer and electrically connected to at least a second part of the second line layer,
    wherein the second line layer comprises a plurality of second lead lines connected to at least one of the circuit signal lines, the driving integrated circuit, and the panel signal lines,
    wherein the second lead lines comprise:
    a first sub-lead line configured to supply a scan-high voltage signal from the driving integrated circuit to the panel signal lines,
    a second sub-lead line configured to supply a scan-low voltage signal from the driving integrated circuit to the panel signal lines,
    a third sub-lead line physically connected to the driving integrated circuit,
    a fourth sub-lead line separated from the third sub-lead line in a first direction,
    a fifth sub-lead line spaced apart from the third sub-lead line in a second direction intersecting the first direction, and
    a sixth sub-lead line spaced apart from the fourth sub-lead line in the second direction, wherein the fifth sub-lead line and the sixth sub-lead line and are electrically connected to the second circuit board and
    wherein the second direction is toward the second circuit board from the first lead lines.

2. The display device of claim 1, wherein the third sub-lead line extends from the first sub-lead line in the second direction, and
    wherein the fifth sub-lead line extends from the second sub-lead line in the second direction.

3. The display device of claim 2, wherein the third sub-lead line is electrically separated from the fourth sub-lead line, and
    wherein the fifth sub-lead line is electrically separated from the sixth sub-lead line.

4. The display device of claim 3, wherein the plurality of second lead lines comprises a seventh sub-lead line on one side of the third sub-lead line and the fifth sub-lead line in the first direction, and a eighth sub-lead line and a ninth sub-lead line on an opposite side thereof in the first direction, wherein the seventh sub-lead line electrically connects a circuit signal line with the driving integrated circuit, and wherein the eighth sub-lead line and the ninth sub-lead line electrically connects the circuit signal lines with the second lead lines.

5. The display device of claim 4, wherein the eighth sub-lead line is configured to supply a high-level voltage signal from the second circuit board to the panel signal lines, and
    wherein the ninth sub-lead line is configured to supply a low-level voltage signal from the second circuit board to the panel signal lines.

6. The display device of claim 5, wherein the plurality of first second lines comprise a tenth sub-lead line on one side of the first sub-lead line and the second sub-lead line in the first direction, and a eleventh sub-lead line and a twelfth sub-lead line on another side thereof in the first direction,
    wherein the tenth sub-lead line is electrically connected to the driving integrated circuit, and
    wherein the eleventh sub-lead line is electrically connected to the eighth sub-lead line, and wherein the twelfth sub-lead line is electrically connected to the ninth sub lead line.

7. The display device of claim 6, wherein the plurality of first lead lines of the first line layer comprises:
    a thirteenth sub-lead line connected to the first sub-lead line,
    a fourteenth sub-lead line connected to the second sub-lead line,
    a fifteenth sub-lead line connected to the tenth sub-lead line,
    a sixteenth sub-lead line connected to the eleventh sub-lead line,
    a seventeenth sub-lead line connected to the twelfth sub-lead line.

8. The display device of claim 7, wherein the via holes comprise a first via hole connecting the thirteenth sub-lead line with the first sub-lead line, and a second via hole connecting the seventeenth sub-lead line with the twelfth sub-lead line, and
    wherein the second via hole is closer to the second circuit board than the first via hole is when viewed a plan view.

9. The display device of claim 1, wherein the first sub-lead line is a gate-high voltage line (VGHL) and the second sub-lead line is a gate-low voltage line (VGLL).

10. The display device of claim 1, further comprising:
a cover panel sheet,
wherein the cover panel sheet comprises a metal layer under the display panel, and a cover insulating layer under the metal layer, and
wherein the first circuit board is bent away from a display surface to be located under the cover insulating layer.

11. The display device of claim 10, wherein the metal layer is an electromagnetic-wave blocking layer.

12. The display device of claim 10, wherein the cover insulating layer comprises fluorine ions or sulfur ions.

13. The display device of claim 12, wherein the first circuit board further comprises a first protective organic layer between the cover insulating layer and the first line layer, and a second protective organic layer on the second line layer,
wherein the first protective organic layer partially exposes an upper surface of the first lead line.

14. The display device of claim 13, wherein inner side surfaces of the first protective organic layer, the first line layer, the insulating layer, the second line layer and the second protective organic layer are aligned with one another in a thickness direction and are exposed.

15. The display device of claim 13, further comprising: an inter-module coupling member between the first protective organic layer and the cover insulating layer and coupling the cover panel sheet with the first circuit board.

16. The display device of claim 15, wherein an inner side surface of the first circuit board protrudes inward from an inner side surface of the inter-module coupling member.

17. The display device of claim 16, wherein the first line layer and/or the first protective organic layer comprise surface cracks around the inner side surface of the inter-module coupling member when viewed from a plan view.

18. A printed circuit board comprising:
a first line layer;
an insulating layer on the first line layer and comprising via holes;
a second line layer on the insulating layer and electrically connected to the first line layer through the via holes; and
a driving integrated circuit on the second line layer and electrically connected to the second line layer,
wherein the second line layer comprises a first line group located on a side of the driving integrated circuit in a first direction to be connected to the driving integrated circuit and spaced apart from one another in a second direction intersecting the first direction, and a second line group located on an opposite side of the driving integrated circuit in the first direction to be connected to the driving integrated circuit,
wherein each of the first line group and the second line group comprises a plurality of sub-lead lines,
wherein the first line group comprises:
a first sub-lead line configured to supply a scan-high voltage signal from the driving integrated circuit to panel signal lines, and
a second sub-lead line configured to supply a scan-low voltage signal from the driving integrated circuit to the panel signal lines,
wherein the second line group comprises:
a third sub-lead line physically connected to the driving integrated circuit,
a fourth sub-lead line separated from the third sub-lead line in a first direction,
a fifth sub-lead line spaced apart from the third sub-lead line in a second direction intersecting the first direction, and
a sixth sub-lead line spaced apart from the fourth sub-lead line in the second direction, and wherein the second direction is toward the second line group from the driving integrated circuit.

19. The printed circuit board of claim 18, wherein the third sub-lead line is electrically separated from the fourth sub-lead line, and
wherein the fifth sub-lead line is electrically separated from the sixth sub-lead line.

20. The printed circuit board of claim 19, wherein the second line group comprises a seventh sub-lead line on one side of the third sub-lead line and the fifth sub-lead line in the first direction, and a eighth sub-lead line and a ninth sub-lead line on another side thereof in the first direction,
wherein the eighth sub-lead line supplies a high-level voltage signal to a display panel, and
wherein the ninth sub-lead line supplies a low-level voltage signal to the display panel.

* * * * *